(12) United States Patent
Litsios et al.

(10) Patent No.: US 10,979,229 B2
(45) Date of Patent: Apr. 13, 2021

(54) COMPUTER SYSTEM AND METHOD FOR DISTRIBUTED PRIVACY-PRESERVING SHARED EXECUTION OF ONE OR MORE PROCESSES

(71) Applicant: Digital Asset (Switzerland) GmbH, Zurich (CH)

(72) Inventors: James Benton Litsios, Zurich (CH); Simon Meier, Zurich (CH); Ognjen Maric, Zurich (CH); Soeren Gerhard Bleikertz, Zurich (CH); Francesco Mazzoli, Zurich (CH)

(73) Assignee: Digital Asset (Switzerland) GmbH

( * ) Notice: Subject to any disclaimer, the term of this patent is extended or adjusted under 35 U.S.C. 154(b) by 0 days.

(21) Appl. No.: 16/343,955

(22) PCT Filed: Oct. 26, 2018

(86) PCT No.: PCT/IB2018/058375
§ 371 (c)(1),
(2) Date: Apr. 22, 2019

(87) PCT Pub. No.: WO2019/082142
PCT Pub. Date: May 2, 2019

(65) Prior Publication Data
US 2020/0127841 A1 Apr. 23, 2020

(30) Foreign Application Priority Data
Oct. 27, 2017 (AU) .................. 2017904367

(51) Int. Cl.
*H04L 9/32* (2006.01)
*G06F 21/54* (2013.01)
*G06Q 20/06* (2012.01)

(52) U.S. Cl.
CPC ............ *H04L 9/3236* (2013.01); *G06F 21/54* (2013.01); *G06Q 20/0658* (2013.01);
(Continued)

(58) Field of Classification Search
CPC . H04L 9/3236; H04L 9/3247; H04L 2209/38; H04L 2209/56; G06F 21/54; G06Q 20/0658
See application file for complete search history.

(56) References Cited

U.S. PATENT DOCUMENTS 9,641,342 B2 * 5/2017 Shram .................. H04L 9/3236
2012/0209749 A1 8/2012 Hammad et al.
(Continued)

FOREIGN PATENT DOCUMENTS

CN 106682530 A 5/2017
CN 106803175 A 6/2017
(Continued)

OTHER PUBLICATIONS

Hofman, Darra, Legally Speaking: Smart Contracts, Archival Bonds, and Linked Data in the Blockchain, Jul. 2017, 26th International Conference on Computer Communication and Networks, pp. 1-4 (Year: 2017).*

(Continued)

*Primary Examiner* — Kenneth W Chang
(74) *Attorney, Agent, or Firm* — Lerner, David, Littenberg, Krumholz & Mentlik, LLP

(57) ABSTRACT

A computer system (100) for distributed shared execution of one or more shared processes, comprising: first program code for the one or more shared processes that comprises one or more shared code segments (142, 144, 146) shared between a first authorizing node (102) and a second authorizing node (104), wherein the one or more shared code segments (142, 144, 146) are executable by one or more
(Continued)

executing nodes (102, 104, 106); a distributed ledger (152, 154, 156) that provides a record of valid code segments of the program code; and second program code comprising instructions that, when executed by the first and/or second authorizing nodes, validates that an anticipated execution result of the one or more shared code segments (142, 144, 146) satisfies shared authorization conditions and, if satisfied, authorizes the execution of the one or more shared code segments by the one or more executing nodes.

29 Claims, 23 Drawing Sheets

(52) U.S. Cl.
CPC ........ *H04L 9/3247* (2013.01); *H04L 2209/38* (2013.01); *H04L 2209/56* (2013.01)

(56) References Cited

U.S. PATENT DOCUMENTS

| | | | |
|---|---|---|---|
| 2016/0260169 A1* | 9/2016 | Arnold | G06Q 40/12 |
| 2016/0261690 A1* | 9/2016 | Ford | H04L 9/3239 |
| 2017/0177898 A1* | 6/2017 | Dillenberger | H04L 9/3236 |
| 2017/0243209 A1* | 8/2017 | Johnsrud | G06Q 20/40 |
| 2017/0279774 A1* | 9/2017 | Booz | G06Q 20/123 |
| 2017/0300627 A1* | 10/2017 | Giordano | G06F 21/6245 |
| 2017/0301033 A1* | 10/2017 | Brown | G06Q 20/3825 |
| 2017/0301047 A1 | 10/2017 | Brown et al. | |

FOREIGN PATENT DOCUMENTS

| | | |
|---|---|---|
| WO | WO-2017/145006 | 8/2017 |
| WO | WO-2017/167550 | 10/2017 |

OTHER PUBLICATIONS

Notification of Transmittal of the International Search Report and the Written Opinion of the International Searching Authority dated Dec. 14, 2018, in International Application No. PCT/IB2018/058375; 13 pages.
International-Type Search Report dated May 8, 2018, in Australian Application No. 2017904367; 13 pages.
K, Ken. (Jan. 2015). "Tutorial 1: Your first contract," located at https://web.archive.org/save/_embed/https://forum.ethereum.org/discussion/1634/tutorial-1-your-first-contract/p1. (22 pages).
Xu, X. et al. "The Blockchain as a Software Connector," *13th Working IEEE/IFIP Conference on Software Architecture (WICSA 2016)*, Venice, Italy, Apr. 7, 2016; 10 pages.
Ethereum Community. (Mar. 2017). *Ethereum Homestead Documentation: Release 0.1*; pp. 1-127.
Hearn, M. (Nov. 2016). "Corda: A distributed ledger;" located at https://docs.corda.net/_static/corda-technical-whitepaper.pdf. (pp. 1-56).
Australian Search Report for Application No. 2019219861, dated Jun. 25, 2020, 1 page.
Extended European Search Report including Written Opinion for EP20156473.9 dated Jul. 28, 2020; 6 pages.
International Search Report for PCT/IB2018/058375 dated Jan. 7, 2019; 3 pages.
Search Report from Chinese Office Action for Application No. 2018800702212 dated Oct. 10, 2020; 2 pages.

* cited by examiner

```
demo = scenario
  [ pass timeUntilToday ~> now

-- Bank creates some cash for Charlie
  ; 'Bank' commits (
      (create (cashIou 'Bank' 'Charlie' 10000)) ~> charlieCash0

-- Charlie transfer some of it to Alice
  ; 'Charlie' commits (
      update
        [ 'Charlie' exercises "split" with 1000 on charlieCash0
            ~> splitCashIds
        ; 'Charlie' exercises "transfer" with 'Alice'
            on splitCashIds[first] ~> aliceCashId
        ; return (charlie: splitCashIds[second], alice: aliceCashId)
        ]
    ) ~>
      cashSetupIds -- Bob proposes to Alice to paint her house
  ; 'Bob' commits (
      create (
        offerToPaintHouse
          'Bob' 'Alice'
          "Alice's House, Princeton, NJ" (now + days 30.0)
          'Bank' 1000  (now + days 7.0)
      )
    ) ~> offer
  ; pass (days 2.0)

-- Yes, Alice is in and pays Bob to do the job
  ; 'Alice' commits (
      'Alice' exercises "accept" with cashSetupIds[alice] on offer
    ) ~> (payment: moneyBob, obligation: paintHouseAgreement1)
```

Fig. 9A

```
-- But now Bob wants to delegate the painting job to his friend Robert, at the same price
; 'Bob' commits (
    'Bob' exercises "delegate"
        with 'Robert', 1000 on paintHouseAgreement1
) ~> delegationProposal1
```

```
-- Alice accepts that Robert takes over the job
; 'Alice' commits (
    'Alice' exercises "accept" on delegationProposal1
) ~> delegationProposal2
```

```
-- Robert says he ok, but he still needs to be paid
; 'Robert' commits (
    'Robert' exercises "accept" on delegationProposal2
) ~> delegationProposal3
```

```
-- Bob transfers the money, and the paint obligation, and is no longer a party to the deal
; 'Bob' commits (
    'Bob' exercises "finalizeDelegation" with moneyBob on delegationProposal3
) ~> {payment: moneyRobert, obligation: paintHouseAgreement2}
```

```
-- Alice finalize the relation in order to avoid further delegation
; 'Alice' commits (
    'Alice' exercises "finalize" on paintHouseAgreement2
) ~> paintHouseAgreement3
1;
```

Fig. 9B

```
-- Cash settlement agreement
template mustPayToAccount                                              1000
    (obligor :: Party)
    (owner :: Party)
    (amount :: Integer)
    (account :: Text)
=
    -- IP shared I/O by obligor and owner authorizing nodes
    obligor, owner agree
        ( toText obligor <> " will credit account '"
            <> account <> "' with USD " <> toText amount <> "."
        );
```

```
template cashIou                                                       1001
    (obligor :: Party)
    (owner :: Party)
    (amount :: Integer)
=
  await                                                                1002
  { "call" :
      owner chooses account :: Text then
          (create (mustPayToAccount obligor owner amount account))
  , "transfer" :                                                       1004
      owner chooses newOwner :: Party then
          (create (cashIou obligor newOwner amount))
  , "split" :                                                          1006
      owner chooses split :: Integer
      such that
          split < amount && split > 0
      then
        update
          [ create (cashIou obligor owner split) ~> firstId
          ; create (cashIou obligor owner (amount - split)) ~> secondId
          ; return { first: firstId, second: secondId }
          ]
  };
```

```
template paintHouse =                                                  1008
    \ (painter :: Party)
      (beneficiary :: Party)
      (houseAddress :: Text)
      (deadline :: Time)
    ->
    painter, beneficiary agree
        ( toText painter <> " will freshly paint the house of " <>
toText beneficiary
            <> " at address '" <> houseAddress
            <> "' until " <> toText deadline
        );
```

```
template offerToPaintHouse                                             1009
    (painter :: Party)
    (beneficiary :: Party)
    (houseAddress :: Text)
    (paintDeadline :: Time)
    (paymentObligor :: Party)
    (paymentAmount :: Integer)
    (offerValidUntil :: Time)
=
  await                                                                1010
  { "accept":
      beneficiary chooses cashId :: ContractId until
offerValidUntil
      then
        match cashId with cashIou paymentObligor beneficiary
paymentAmount
          in update
            [ beneficiary exercises "transfer" with painter on
cashId ~> paymentId
            ; create (paintHouseWithDelegation painter
beneficiary houseAddress paintDeadline) ~> obligationId
            ; return {payment: paymentId, obligation:
obligationId}
            ]
  , "reject": beneficiary chooses then return {}                       1010b
  , "withdraw": painter chooses after offerValidUntil then return {}
  };                                                                   1010c
```

Fig. 10A

```
template paintHouseWithDelegation =
\ (painter :: Party)
  (beneficiary :: Party)
  (houseAddress :: Text)
  (deadline :: Time)
-> 
await
  { "finalize":
      beneficiary chooses
      then
        (create (paintHouse painter beneficiary houseAddress
deadline))
  , "delegate" :
      (- choice to delegate the house painting to another painter -)
      painter chooses newPainter :: Party, newAmount :: Integer
      then
        (create (paintHouseDelegationOffer1 newPainter
newAmount painter beneficiary houseAddress deadline))
  };
```
1011, 1012, 1014

```
template paintHouse =
\ (painter :: Party)
  (beneficiary :: Party)
  (houseAddress :: Text)
  (deadline :: Time)
-> 
painter, beneficiary agree
  ( toText painter <> " will freshly paint the house of "
    <> toText beneficiary <> " at address '" <> houseAddress
    <> "' until " <> toText deadline
  );
```
1016

```
template paintHouseDelegationOffer1 =
\ (newPainter :: Party)
  (newAmount :: Integer)
  (oldPainter :: Party)
  (beneficiary :: Party)
  (houseAddress :: Text)
  (deadline :: Time)
-> 
await
  { "accept":
      beneficiary chooses
      then
        (create (paintHouseDelegationOffer2 newPainter
newAmount oldPainter beneficiary houseAddress deadline))
  , "reject":
      beneficiary chooses
      then
        (create (paintHouseWithDelegation oldPainter
beneficiary houseAddress deadline))
  , "withdrawDelegation":
      oldPainter chooses
      then
        (create (paintHouseWithDelegation oldPainter
beneficiary houseAddress deadline))
  };
```
1017, 1018, 1020, 1022

Fig. 10B

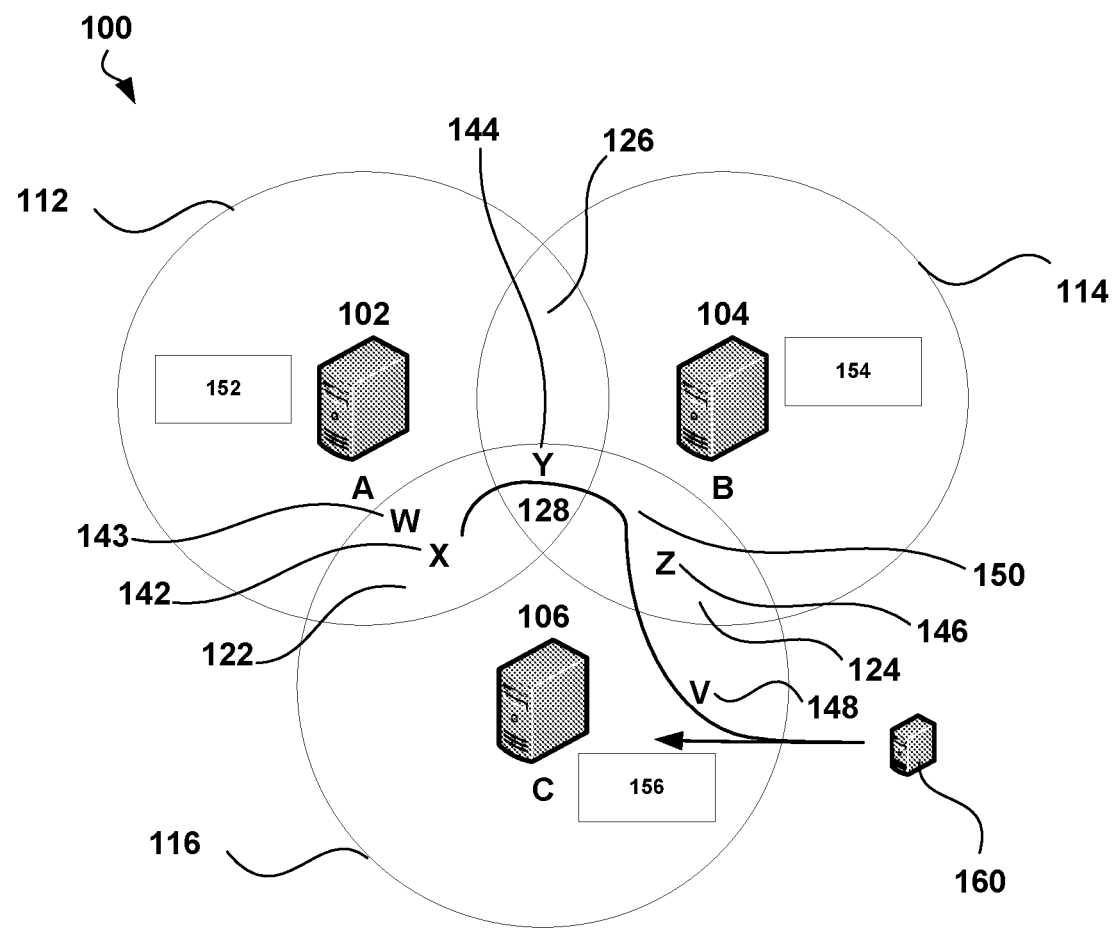
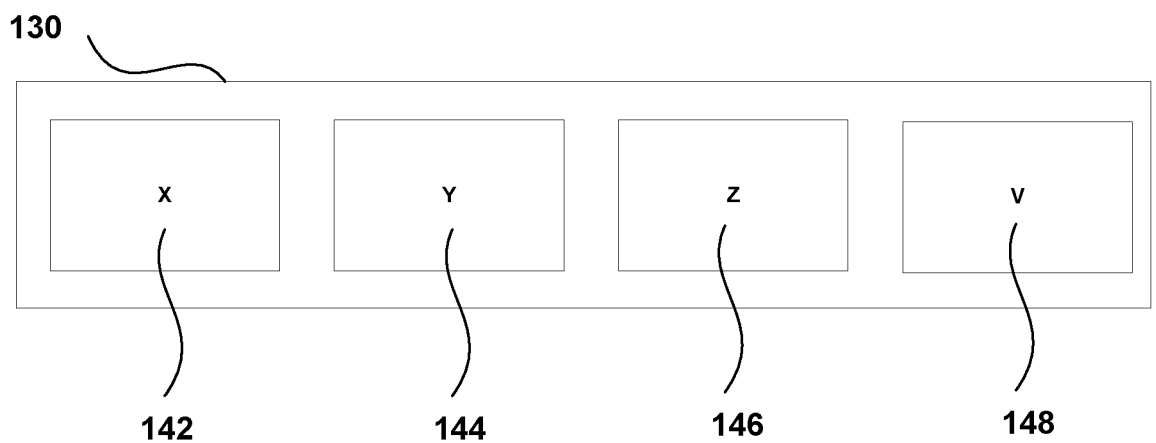
Fig. 11

```
-- Cash settlement agreement
template mustPayToAccount
    (account :: Text)
  =
    -- IP shared I/O by 'Bank' and 'Charlie' authorizing nodes
    'Bank', 'Charlie' agree
      ( toText 'Bank' <> " will credit account '"
      <> account <> "' with USD " <> toText 1000 <> "."
      );

await
{ "call" :
    'Charlie' chooses account :: Text then
    (create (mustPayToAccount account))

, "transfer" :
    'Charlie' chooses new'Charlie' :: Party then
    (create (cashIou 'Bank' new'Charlie' 1000))

, "split" :
    'Charlie' chooses split :: Integer
    such that
      split < 1000 && split > 0
    then
      update
        [ create (cashIou 'Bank' 'Charlie' split) ~> firstId
        ; create (cashIou 'Bank' 'Charlie' (1000 - split)) ~> secondId
        ; return { first: firstId, second: secondId }
        ]
};
```

1302
1302b
1302c

"'Charlie' exercises "call" with "ABC100""

1304

```
'Bank', 'Charlie' agree
  ("Bank will credit account 'ABC100' with USD 1000."
  );
```

COMPUTER SYSTEM AND METHOD FOR DISTRIBUTED PRIVACY-PRESERVING SHARED EXECUTION OF ONE OR MORE PROCESSES

CROSS-REFERENCE TO RELATED PATENT APPLICATIONS

This application claims the benefit of International Application No. PCT/IB2018/058375, filed Oct. 26, 2018, which claims priority to Australian Application No. 2017904367, filed Oct. 27, 2017, each of which is hereby incorporated by reference in its entirety.

TECHNICAL FIELD

The present disclosure relates to a computer system, comprising a plurality of nodes, for distributed privacy-preserving shared execution of one or more shared processes. The disclosure also relates to a computer implemented method for performing distributed privacy-preserving shared execution.

BACKGROUND

A distributed system has components located on networked computers that communicate and coordinate their actions by passing messages. The components may interact with other components in order to achieve a common goal.

However, distributed privacy-preserving shared executions on distributed and privacy-preserving systems can be problematic as each computer or node has only a limited or incomplete view of the system. Each computer or node may know only one part of the program code or input data. Each computer may be able to certifiably verify and execute a program with part of the input data that is known to them, but then each computer would still not be able to know with any assurance whether the certified verifications and executions performed by any other computer are valid (in the sense that the code verified and executed was validly part of the intended program code that was to be verified and executed) and accurate (in the sense that the verification and execution of the code was correct). Furthermore, coordinating distributed computers so as to be able to provide validity and accuracy of verification and executions is difficult.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A computer system for distributed shared execution of one or more shared processes, comprising: first program code for the one or more shared processes that comprises one or more shared code segments shared between a first authorizing node and a second authorizing node, wherein the one or more shared code segments are executable by one or more executing nodes; a distributed ledger that provides a record of valid code segments of the program code; and second program code comprising instructions that, when executed by the first and/or second authorizing nodes, validates that an anticipated execution result of the one or more shared code segments satisfies shared authorization conditions and, if satisfied, authorizes the execution of the one or more shared code segments by the one or more executing nodes.

In this system, nodes are able to pre-agree in a verifiable manner to existing or new obligations they enter into. Shared code segments contain obligations and which may involve providing execution of code, or providing input/output to ensure code executes. Nodes are able commit data or code in a non-repudiable fashion to the distributed ledger (utilising for example Merkle proofs), while allowing the later selective revealing of that secret data or code where required. This enables system wide coordination of the execution of shared processes whereby nodes can act, and authorize, execution of shared code segments and verify execution of code.

There is also disclosed a computer system for distributed shared execution of one or more shared processes, comprising: first program code for the one or more shared processes that comprises one or more shared code segments shared between a first authorizing node and a second authorizing node, wherein the one or more shared code segments are executable by one or more executing nodes; a distributed ledger that provides a record of the execution of shared code segments of the program code; and second program code comprising instructions that, when executed by the first and/or second authorizing nodes, validates that an anticipated execution result of the one or more shared code segments satisfies shared authorization conditions and, if satisfied, authorizes the execution of the one or more shared code segments by the one or more executing nodes. In some examples, the distributed ledger provides a record of valid shared code segments of the program code.

In this system, nodes are able to agree that existing or new shared program code is the sole reference to validate the proposed authorized changes of distributed ledger states. This enables system wide coordination of versions of code where nodes can verify the correct shared code segments to be executed.

In some examples of the computer system, the one or more executing nodes is one of the first authorizing node or second authorizing node.

In some examples of the computer system, the one or more shared code segments are jointly executable by the one or more executing nodes.

In some examples, the program code further comprises one or more specified execution conditions, and a first of the one or more specified execution conditions specifies that the execution of the one or more shared code segments is dependent on the first specified execution condition being valid.

In some examples, the computer system further comprises third program code that, when executed, causes any of the plurality of authorizing nodes to request one or more other nodes to perform an action.

In some examples, the request comprises an authorization for performing a requested action. In another example, the request comprises a delegation to the other node for performing a requested action. In yet another example, the request comprises a commitment by the other node to perform a requested action. In yet another example, the request comprises a request for execution of one of the one or more shared code segments. In a further example, the request comprises an authorization to the other node to make a subsequent request. In another example, the request comprises a delegation to the other node to make a subsequent request. In a further example, the request comprises a commitment by the other node to make a subsequent request.

In some examples of the computer system, an authorization by a particular authorizing node, that is not an executing node, includes permission to an executing node to execute a shared code segment on behalf of the particular authorizing node.

In some examples an authorization, by a particular authorizing node, that is not an executing node, includes permission for a delegated executing node to execute a shared code segment on behalf of the particular authorizing node that has delegated the execution action for that shared code segment.

In some examples, the authorization by the first authorizing node and second authorizing node is an authorization of an execution of a shared code segment or a pre-existing authorization for execution of multiple code segments.

In some examples of the computer system, the one of the one or more executing nodes is a committing node that commits to execute shared code segments shared with one or more authorizing nodes. In a further example, any one of the authorizing nodes or executing nodes, of a specified shared code segment can query the system to identify executing nodes, required to commit as committing node(s), to execute the specified shared code segment.

In some examples of the computer system any one of the authorizing nodes or executing nodes, of a specified shared code segment, can query the system to identify authorizing nodes required to authorize execution of, or delegate the execution of, the specified shared code segment.

In some examples of the computer system, any one of the authorizing nodes or executing nodes, of the specified shared code segment, can query the system from the identified executing or authorizing nodes, nodes that have not yet provided authorization, delegation, commitments, or inputs/outputs required to execute the specified shared code segment.

In some examples of the computer system, the system restricts execution of a shared code segment unless the node(s), if any, that have not yet provided authorization, delegation, commitments, or inputs/outputs required to execute the specified code segment are identified and the executing node determines that required authorization, delegation, commitments, or inputs/outputs will be received from the identified nodes.

The computer system may further comprise an auditor node, wherein the auditor node determines based on the record on the distributed ledger, the validity of the record of shared code segments and record of execution of code and flags invalid records.

In some examples, the distributed ledger is a blockchain.

In some examples, the computer system allows rewriting shared code segments, wherein rewriting includes writing a new shared code segment in the distributed ledger that, in the program code, supersede an old shared code segment in the distributed ledger. Rewriting may comprise providing one or more modified parameters to an existing data object used within shared code.

In some examples of the computer system, at least one of the shared code segments includes, during execution by an executing node, receiving an input from one or more external node(s), wherein execution of the at least one shared code segment, or subsequent shared code segment, is dependent on the input.

In some examples of the computer system at least one shared code segment includes, during execution, an output to one or more external nodes, wherein the input from the one or more external node(s) is dependent an operation based on the output.

In some examples, the shared authorization conditions require that the anticipated execution result of the one or more shared code segments be cryptographically authorized by the first and/or second authorizing node.

In one example of the computer system, the cryptographic authorization of the anticipated execution result comprises either an explicit or implicit cryptographic authorization of the anticipated execution result of the one or more shared code segments.

In a further example of the computer system, the explicit cryptographic authorization of the anticipated execution result of the one or more shared code segments comprises, as part of the second program code if the shared authorization conditions are satisfied, the first and/or second authorizing nodes cryptographically signing at least part of the anticipated execution result.

In yet a further example of the computer system, the first and/or second authorizing nodes, as part of the second program code if the shared authorization conditions are satisfied, cryptographically sign a transaction payload that is configured to cause a state transition to occur on the distributed ledger.

In some examples of the computer system, the implicit cryptographic authorization of the anticipated execution result of the one or more shared code segments comprises, as part of the second program code if the shared authorization conditions are satisfied, the first and/or second authorizing nodes utilizing a delegated or committing authorization from one or more delegating or committing nodes to authorize execution of the one or more shared code segments.

In a further example, the delegated or committing authorization comprises the one or more delegating or committing nodes cryptographically authorizing the execution of a previously-executed shared code segment.

In another example, the cryptographic authorization of the execution of the previously-executed shared code segment comprises the one or more delegating or committing nodes cryptographically signing at least part of an anticipated execution result of the previously-executed shared code segment.

In some examples of the computer system, the execution result of the previously-executed shared code segment creates or activates the one or more shared code segments.

In some examples, the shared authorization conditions require that any possible execution result stemming from execution of the one or more shared code segments satisfies shared execution conditions.

In some examples, the shared execution conditions require that any delegated authorization be traceable back to a delegating node that requested the delegated authorization by way of a preceding transaction proposal request.

In some examples, the shared execution conditions require that any committing authorization be traceable back to a committing node that requested the committing authorization by way of a preceding transaction proposal request.

In some examples, the shared authorization conditions require that all delegated authorizations comprise a cryptographic signature of the respective delegating node authorizing a request for the relevant delegated authorization.

In further examples, the shared authorization conditions require that all committing authorizations comprise a cryptographic signature of the respective committing node authorizing a request for the relevant committing authorization.

In another example, the shared execution conditions require that any possible execution result stemming from execution of any code segments created, activated, or executed by the execution of the one or more shared code segments satisfies shared execution path conditions.

In some examples, the shared execution path conditions require that any possible execution result stemming from execution of the created, activated, or executed code segments is traceable to a cryptographic authorization from an authorizing node.

In some examples, the shared execution path conditions require at least one execution path to exist.

In one example of the computer system, the second program code further comprises program instructions that, when executed, determines all explicit and implicit cryptographic authorizations required for authorized execution of the one or more shared code segments and, if not all explicit and implicit cryptographic authorizations are present, does not authorize execution of the one or more shared code segments.

In one example of the computer system, execution of valid shared codes segments of the program code includes dynamically assembling valid code segments, wherein the valid shared code segments are identified through a query for code segments that match a template or parameters.

In another example of the computer system, one or more shared code segments is determined to be valid based on analysis that the code includes one or more of: authorization to execute; commit to execute; delegation to execute; or commit to perform an input or output from the system, wherein a shared code segment determined to be valid is: recordable on the distributed ledger; and/or executable by one or more executing nodes. In a further example of the computer system, on determination that a shared code segment on the distributed ledger is not valid, the code segment is not executable by the executing nodes.

There is also provided a computer implemented method for distributed shared execution of one or more shared processes, comprising: authorizing one or more shared code segments forming at least part of program code for the one or more shared processes, the shared code segments shared between a first authorizing node and a second authorizing node, wherein the one or more shared code segments are executable by one or more executing nodes; recording valid shared code segments of the program code on a distributed ledger; and validating that an anticipated execution result of the one or more shared code segments satisfies shared authorization conditions and, if satisfied, authorizing the execution of the one or more shared code segments by the one or more executing nodes.

A computer implemented method for shared execution of one or more shared processes, comprising: authorizing one or more shared code segments forming at least part of program code for the one or more shared processes, the shared code segments shared between a first authorizing node and a second authorizing node, wherein the one or more shared code segments are executable by one or more executing nodes; validating that an anticipated execution result of the one or more shared code segments satisfies shared authorization conditions and, if satisfied, authorizing the execution of the one or more shared code segments by the one or more executing nodes; executing the validated shared code segments; and recording the execution of shared code segments of the program code on a distributed ledger.

In some examples, the method further comprises recording validated shared code segments of the program code on the distributed ledger.

In some examples of the method, the one or more executing nodes is one of the first authorizing node or the second authorizing node.

In some examples, the one or more shared code segments are jointly executable by the executing nodes. In some examples, joint execution of one or more code segments include shared execution by multiple executing nodes.

In some examples of the method, the program code further comprises one or more specified execution conditions, and a first of the one or more specified execution conditions specifies that the execution of the one or more shared code segments is dependent on the first specified execution condition being valid.

In some examples the method further comprises sending a request, from one authorizing node to another authorizing node, to perform an action. In some examples, the request comprises an authorization for performing a requested action. In some examples, the request comprises a delegation to the other node for performing a requested action. In some examples, the request comprises a commitment by the other node to perform a requested action. In some examples, the request comprises a request for execution of one of the one or more code segments. In some examples, the request comprises an authorization to the other node to make a subsequent request. In some examples, the request comprises a delegation to the other node to make a subsequent request. In some examples, the request comprises a commitment by the other node to make a subsequent request.

In some examples of the method an authorization by a particular authorizing node, that is not an executing node, includes permission to an executing node to execute a shared code segment on behalf of the particular authorizing node.

In some examples of the method an authorization, by a particular authorizing node, that is not an executing node, includes permission for a delegated executing node to execute a shared code segment on behalf of the particular authorizing node that has delegated the execution action for that shared code segment.

In some examples the authorization by the first authorizing node and second authorizing node is an authorization of an execution of a shared code segment or a pre-existing authorization for execution of multiple shared code segments.

In some examples one of the one or more executing nodes is a committing node, wherein the method further comprises recording on a distributed ledger, a commitment by the committing node to execute shared code segments shared with one or more authorizing nodes.

In some examples the method further comprises querying, the distributed ledger and/or nodes, to identify executing nodes, required to commit as committing node(s), to execute a specified shared code segment.

In some examples the method further comprises querying, the distributed ledger and/or nodes, to identify authorizing nodes required to authorize execution of, or delegate the execution of, a specified shared code segment.

In further example, the method also comprises querying from the identified executing or authorizing nodes, nodes that have not yet provided authorization, delegation, commitments, or inputs/outputs required to execute the specified shared code segment.

In some examples of the method, execution of shared code segments is conditional on: identifying the nodes that have not yet provided authorization, delegation, commitments, or inputs/outputs required to execute the specified shared code segments; and determining that required authorization, delegation, commitments, or inputs/outputs will be received from the identified nodes.

In some examples the method further comprises determining, by an auditor node, the validity of the record of shared code segments and record of execution of code on the distributed ledger; and flagging invalid records.

In some examples of the method, the distributed ledger is a blockchain.

In some examples, the method further comprises: rewriting shared code segments by writing a new shared code segment in the distributed ledger that supersedes an old shared code segment in the distributed ledger. In some examples, rewriting comprises providing one or more modified parameters to an existing data object.

In some examples the method further comprises receiving an input, from one or more external node(s), during execution of at least one of the shared code segments by an executing node, wherein execution of the at least one code segment, or subsequent code segment, is dependent on the input.

The method may further comprise: sending, to one or more external node(s), an output from the executing node, wherein the input from the one or more external node(s) is dependent on an operation based on the output.

In some examples, the method further comprises, as part of validating the shared authorization conditions, validating that the anticipated execution result of the one or more shared code segments is cryptographically authorized by the first and/or second authorizing node.

In some examples, the cryptographic authorization of the anticipated execution result comprises either an explicit or implicit cryptographic authorization of the anticipated execution result of the one or more shared code segments.

In some examples, wherein the explicit cryptographic authorization of the anticipated execution result of the one or more shared code segments comprises the first and/or second authorizing nodes cryptographically signing at least part of the anticipated execution result.

In one example, the first and/or second authorizing nodes, if the shared authorization conditions are satisfied, cryptographically sign a transaction payload that is configured to cause a state transition to occur on the distributed ledger.

In some examples of the method the implicit cryptographic authorization of the anticipated execution result of the one or more shared code segments comprises, if the shared authorization conditions are satisfied, the first and/or second authorizing nodes utilizing a delegated or committing authorization from one or more delegating or committing nodes to authorize execution of the one or more shared code segments.

In some examples of the method the delegated or committing authorization comprises the one or more delegating or committing nodes cryptographically authorizing the execution of a previously-executed shared code segment.

In some examples the cryptographic authorization of the execution of the previously-executed shared code segment comprises the one or more delegating or committing nodes cryptographically signing at least part of an anticipated execution result of the previously-executed shared code segment.

In another example the execution result of the previously-executed shared code segment creates or activates the one or more shared code segments.

In some examples, the method further comprises, as part of validating the shared authorization conditions, validating that any possible execution result stemming from execution of the one or more shared code segments satisfies shared execution conditions.

The method may further comprise, as part of validating the shared authorization conditions, validating that any delegated authorization is traceable back to a delegating node that requested the delegated authorization by way of a preceding transaction proposal request.

In one example, the method may further comprise, as part of validating the shared authorization conditions, validating that any committing authorization is traceable back to a committing node that requested the committing authorization by way of a preceding transaction proposal request.

In some examples the method further comprises, as part of validating the shared authorization conditions, validating that all delegated authorizations comprise a cryptographic signature of the respective delegating node authorizing a request for the relevant delegated authorization.

The method may further comprise, as part of validating the shared authorization conditions, validating that all committing authorizations comprise a cryptographic signature of the respective committing node authorizing a request for the relevant committing authorization.

In yet another example the method may further comprise, as part of validating the shared execution conditions, validating that any possible execution result stemming from execution of any code segments created, activated, or executed by the execution of the one or more shared code segments satisfies shared execution path conditions.

The method may further comprise, as part of validating the shared execution path conditions, validating that any possible execution result stemming from execution of the created, activated, or executed code segments is traceable to a cryptographic authorization from an authorizing node.

In some examples, the shared execution path conditions require at least one execution path to exist.

In some examples, the method further comprises determining all explicit and implicit cryptographic authorizations required for authorized execution of the one or more shared code segments and, if not all explicit and implicit cryptographic authorizations are present, failing authorization of execution of the one or more shared code segments In one example of the method, execution of valid codes segments of the program code includes: dynamically assembling valid code segments, wherein the valid code segments are identified through querying code segments that match a template or parameters. In further examples, the program code includes: providing authorization data to programs, wherein authorization data is identified through querying code segments created for the purpose of being queried for authorization data.

In another example, the method further comprises: determining one or more code segments as valid based on analysis that the code includes one or more of: authorization to execute; commit to execute; delegation to execute; or commit to perform an input or output from the system. In a further example of the method, the step of recording the valid code segment on the distributed ledger is conditional on determining the code segment is valid. In yet a further example, executing the valid code segment by one or more executing nodes is conditional on determining the code segment is valid.

Software, being machine readable instructions, that when performed by a computer system causes the computer system to perform any one of the methods described above.

BRIEF DESCRIPTION OF DRAWINGS

Examples of the present disclosure will be described with reference to the figures below:

FIGS. 9A and 9B show code representative of execution of program code;

FIGS. 10A to 10C illustrate code templates used in the program code;

FIG. 11 is a schematic diagram of an authorization computer system interacting and an external computer;

FIG. 13 is an example of rewriting shared code segments; and

DESCRIPTION OF EMBODIMENTS

Figure 1:
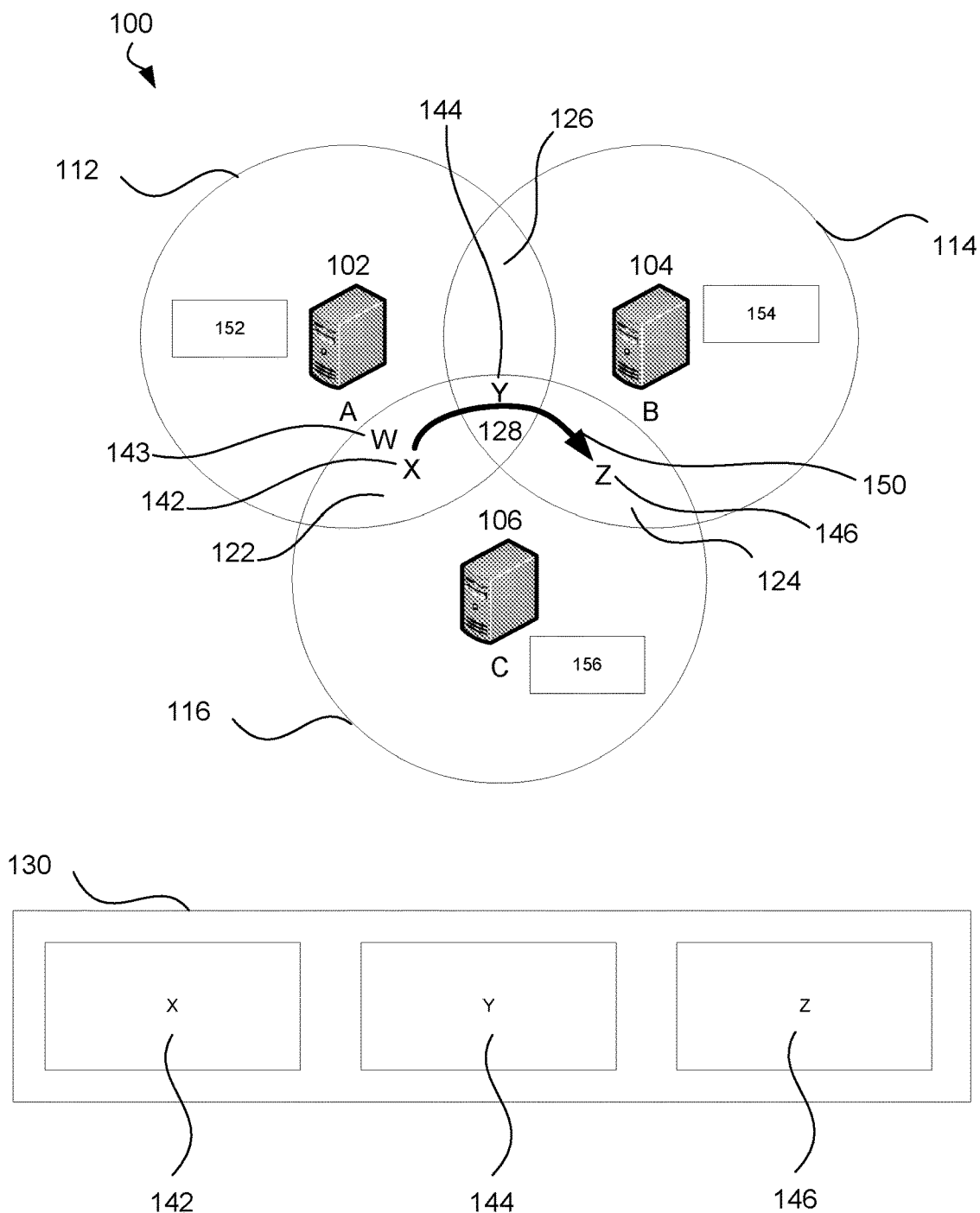
FIG. 1 is a schematic diagram of a computer system for distributed privacy-preserving shared execution of one or more shared processes including multiple authorizing nodes.
Figure 2:
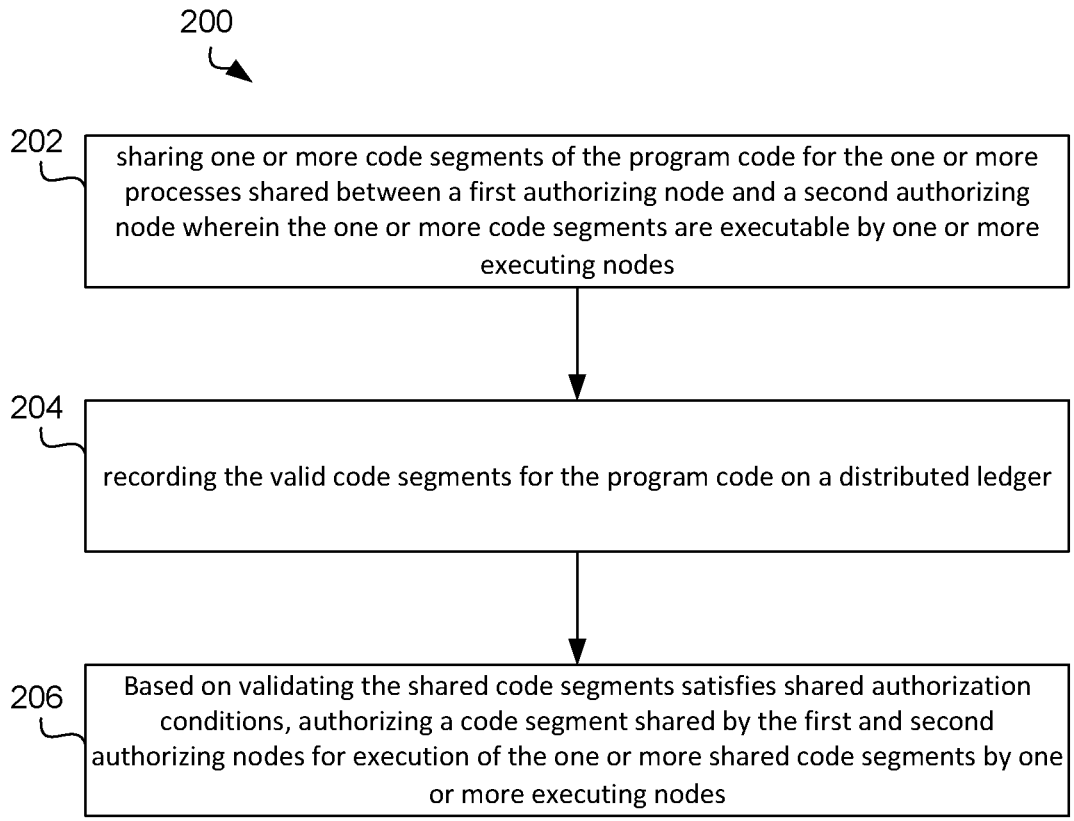
FIG. 2 is a flow diagram of a computer implemented method for distributed privacy-preserving shared execution of one or more shared processes.

FIG. 1 is an illustrated example of a computer system 100 for distributed privacy-preserving shared execution of one or more shared processes, comprising program code 130 for the one or more shared processes that comprises one or more shared code segments 142, 144, 146 that are shared between a first authorizing node 102, a second authorizing node 104, and a third authorizing node 106, and wherein the one or more code segments are executable by one or more executing nodes. In this example the executing nodes are the same as the authorizing nodes 102, 104, 106. There is a distributed ledger 152, 154, 156 that provides a record of valid code segments of the program code, wherein the execution of at least one of the valid code segments is authorized by the first and second authorizing nodes 102, 104 for execution by one of the one or more executing nodes.

Shared Program Code and Shared Code Segments

FIG. 1 shows an example illustration of the shared system 100. The program code 130 can be a set of instructions for a computer, such as program code for performing authorization transactions. The execution of the program code can be distributable and privacy preserving in that rather than the code being executed on a single computer or node, multiple nodes may take control of the execution, and nodes may be excluded from the execution. In order for execution to occur in this distributed manner, there can be some degree of coordination of the nodes, which is provided by the program code 130. Sub-parts of the program code that can be executed by a node are referred to as shared code segments. In this example, the program code 130 is made up of three (3) shared code segments 142, 144 and 146. In this example, the program code 130 specifies that the three (3) code segments should be executed in order 142, then 144, and then 146. The shared code segments may be executed by different nodes.

Authorizing Nodes

Authorizing nodes can be nodes that are involved in execution of shared code segments. An authorizing node can control of execution of program code 130, and authorized control of any authorized computations that are external to the shared system 100 and authorized by the shared system 100.

In this example, the shared system 100 is comprised of three nodes 102, 104, and 106. The circles 112, 114, 116 surrounding the nodes 102, 104, 106 each represent the way in which shared code segments 142, 144, 146 can be private to, or shared by, the nodes. Region 122 represents all the code privately shared between nodes 102 and 106 but not node 104, region 124 represents all code privately shared between nodes 104 and 106 but not node 102, region 126 represents all code privately shared between nodes 102 and 104 but not node 106, and region 128 represents all code shared between all three nodes 102, 104, 106.

As can be seen, each shared code segment may have specified authorization nodes so the group of authorizing nodes can depend on the shared code segment itself. That is, the group of authorizing nodes can be defined in reference to, and specific for, each shared code segment. In this example, the code segment 142 can be shared between nodes 102 and 106 (i.e. in region 122), the code segment 144 can be shared between nodes 102, 104 and 106 (i.e. in region 128), the code segment 146 can be shared between nodes 104 and 106 (i.e. in region 124). Therefore, for the shared code segment 142, the authorizing nodes can be 102 and 106. Similarly, for the shared code segment 142, node 104 might not be an authorizing node.

During execution it is possible for the groups of authorizing nodes to switch to other groups of authorizing nodes as the executing nodes progress through the program code. This can be a result of the specified authorizing nodes being defined by reference to shared code segments. As the code segments change, the authorizing nodes can therefore change accordingly.

It is to be understood that authorizing does not necessarily mean that each node has a copy of the shared code segment although each node may in practice have a copy of the shared code segment. Rather, the shared code segment can be authorized in that the execution of the code segment is dependent on the authorized node in some way. For example, a shared code segment that requires an input from first authorizing node 102 and an input from second authorizing node 104 may be shared between nodes 102 and 104.

Executing Nodes

In addition to authorizing nodes are the executing nodes. Executing nodes can be nodes that execute a shared code segment in accordance with an agreed set of rules. The executing nodes can execute the instructions as specified in the code segment and maintain the active state of execution. Once the executing node has begun execution, the executing node can have control over the execution of the shared code segment, and the I/O provided by any of the authorizing nodes for that code segment.

In this example, the nodes 102, 104 and 106 may determine a node to execute the shared code segments. This executing node may be any node and not necessarily an authorizing node but similarly, the executing node or nodes may be the same node or nodes as the authorizing nodes. In some examples, the executing node may be a specialized executing node that is not a participant to any transactions. In other examples, the executing node of a shared code segment may be one of the authorizing nodes of the code segment. In such a case, an executing node that is also an authorizing node may switch modes as required to give effect to the execution of the shared code segment. In the example in FIG. 1, the executing node for the shared code segment 142 can be the node 104. As described above, the node 104 might not be an authorizing node for the code segment 142.

The nodes may therefore generally have to come to an agreement as to how to execute shared code segments. This may include specifying particular nodes and synchronization of the executing nodes. In order to coordinate the execution, the program code may specify the executing nodes for each of the shared code segments. As above, a shared code segment's dependency on a node means that the executing node may check to see whether that node has given authorization for the code segment to execute.

Distributed Ledger

The distributed ledger can provide certified and authorized data storage, data distribution, privacy, security and enable authorized transactions. In this disclosure, the distributed ledger can have a global synchronization log that stores public data associated with private data. The private data can be stored in one or more private data stores separate from the global synchronization log. The private data in the one or more private data stores might not be accessible to an unauthorized node (or participant associated with the node). A node can verify the public data available on the global synchronization log based on the corresponding private data available to the node in the one or more private data stores. Alternatively, attestation or proof of verification may be performed by one node and sent to another node. In an example, the distributed ledger can be a distributed ledger as disclosed in International Publication No. WO 2018/013934 (related to International Application No. PCT/US2017/042155) or U.S. Application No. 62/748,315, each of which is incorporated by reference herein in its entirety.

Further in this example, each of the nodes 102, 104 and 106 can have a copy of the distributed ledger 152, 154 and 156 respectively, although it is not necessary that each node has a copy of the ledger and the distributed ledger may be at an external node. In this example, each copy of the distributed ledger contains the same public data (i.e. data that is publicly available to everyone) but different private data (i.e. data that is private or confidential to the respective node).

Figure 3:
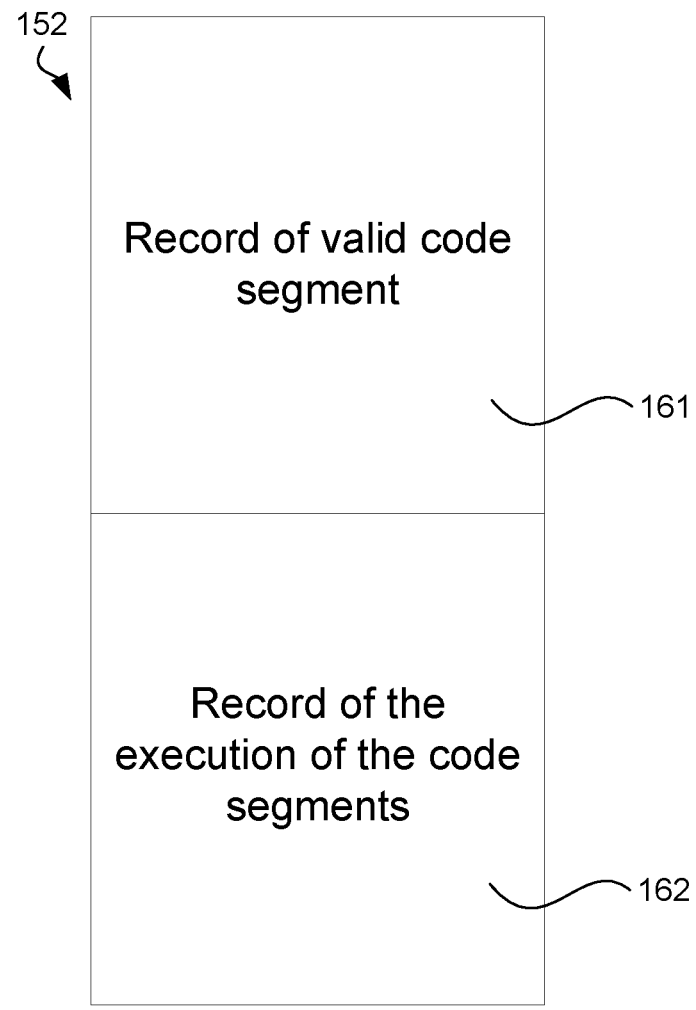
FIG. 3 is s schematic diagram of a data structure in a distributed ledger.

In one embodiment, the distributed ledger provides a record of the execution of shared code segments for the program code. In another embodiment, the distributed ledger provides a record of valid shared code segments of the program code. In yet another embodiment, the distributed ledger provides a record of the validity of execution of the shared code segments of the program code. In these cases, the data stored on the distributed ledger may include a hash value or a cryptographic hash function that produces the hash value, and wherein it is computationally infeasible to falsify the execution of the shared code segment or record an invalid shared code segment based on the hash value. In the example of FIG. 1, the distributed ledger provides both a record of the execution of shared code segments 162 for the program and the record of valid shared code segments 161 of the program code as shown in FIG. 3.

The hashes as described above can be one-way cryptographic functions which can be proven to validate execution or the validity of shared code segments. For example, the cryptographic hash function may be Secure Hash Algorithm 2 (SHA-2). The SHA-2 is just used for illustrative purposes and many other cryptographic hash functions can be used. The choice of the cryptographic hash function is often a trade-off between computational resources and security. For example, a similar cryptographic hash function Secure Hash Algorithm 3 (SHA-3) is more secure than SHA-2, but SHA-2 requires less computational resources. There may be other reasons to choose a particular type of cryptographic hash function, such as a cryptographic hash function that has specific properties or there may be regulatory requirements that affect the available cryptographic hash functions. For example, regulatory requirements may allow SHA-2 to be used and prohibit BLAKE-2 (a cryptographic hash function based on the ChaCha stream cipher).

It should be noted that the hashes themselves do not need to appear in the distributed ledger. In one embodiment a Merkle root can be used. As the Merkle root is essentially a hash of hashes, by committing the Merkle root of the hashes to the distributed ledger the hash of the execution or the code segment is committed to the distributed ledger. In this embodiment, nodes can receive elements (e.g. a subset of leaves) of the corresponding Merkle tree in order to establish whether the execution or shared code segment is valid.

In some embodiments, the distributed ledger is a blockchain where transactions are added to the ledger in blocks which are linked to previous blocks all the way to the original genesis block.

Shared Code Segments

Shared code segments can be pieces of code that contain program instructions for a computer. Shared code segments can be executed by one or more executing nodes and can be authorized by one or more authorizing nodes. The shared code segments together can make up the program code that, as above through execution, may switch from one group of authorizing nodes to another group of authorizing nodes.

In some examples, the shared code segments of the program code are executed in a specified order. For example, execution of program code 130 may begin with shared code segment 142 shared between nodes 102, 106. When execution of the code segment 142 has finished, the program code can transition to the code segment 144, and there can be a similar transition in the next group of authorizing nodes 102, 104, 106. The order of the shared code segments may be specified in the program code, but in addition or alternatively, the shared code segments may have specified execution conditions, which can be the completion of other shared code segments.

Shared code segments can be derived from shared code segment templates, which can be part of program code templates. That is, a code template can comprise one or more shared code segment templates. Shared code templates can be predefined segments of parameterized code with undefined parameters, such that they cannot be executed in themselves. The shared code segments can be instantiated versions of a corresponding shared code segment template, but where the parameters have been defined and specified so that the shared code segments can be executed.

External Code Segments and Events

Shared code segments may be executed and the execution output added to the distributed ledger 152, 154, 156. However, not all authorization or authorized computations need to occur within the shared system 100 and therefore some computations may occur that are external to the system 100. Where such authorization or authorized computations are required as part of the shared code segment or segments, entries on the ledger can be a result from the external computation, generally in the form of input/output (I/O) that reflect whether the external authorized or authorizing computation has taken place.

Typically, an authorizing node can have authorized control over an external computation. That is, an external computation can produce an output initiated by an authorizing node, with given authorized input, which can then communicate the authorized output to the executing node. The executing node can then utilize the output in the execution of code segments. The circumstances for external computations and I/O may be specified by the shared code segments or the program code, and may require authorization from one or more of the authorizing nodes. In some examples, the authorizing nodes maintain the control over the I/O from the external computation so the executing nodes may defer to the authorizing node for the I/O to be provided in order for the execution to continue. Alternatively, the authorizing node may provide the I/O from the external computation upfront when requesting and authorizing execution of the shared code segment.

Authorization

Generally a shared code segment's dependency on a node can mean that the node must give an authorization in order for the code segment to be executed. For example, a code segment shared between B and C may require an authorization from B and an authorization from C in order for the code segment to be executed. Authorization may be authorization for the specific execution of a code segment or it may be a general authorization to execute the node's shared code segments.

Authorizations from nodes may in some embodiments be added to the distributed ledger. In this way, the distributed ledger acts as an authoritative reference of the authorizations, which the executing node can then refer to in order to ensure that all the appropriate authorizations are made for a given code segment in order for the node to execute that code segment.

Exemplary authorizations can be cryptographic signatures by authorizing nodes of proposed changes to the ledger and/or one or more states of the ledger pre or post-change. Executing nodes can provide authorizations when authorized to do so by an authorizing node. This concept is described in example implementations in more detail below.

Querying the System for Authorization, Delegation, and Commitment

The nodes may query the system to determine relevant authorizations, delegations and commitments associated with a shared code segment and/or the program code. This may be useful for an authorizing node, or executing node, so that they can inform themselves of the status of the code segment, for instance whether the code segment execution is authorized. Alternatively, nodes may broadcast relevant authorizations, delegations and commitments associated with a shared code segment and/or the program code to other nodes, or nodes may subscribe to other nodes to determine relevant authorizations, delegations and commitments associated with a shared code segment and/or the program code (e.g. through a persistent connection with other nodes for certain data). While the specific example of a query is disclosed below, it is to be understood that the examples below can alternatively be employed in the context of a broadcast or subscription instead.

In some examples, an authorizing node, executing node, or other node can query the system to identify nodes that are required to authorize execution of, or delegate the execution of, a particular code segment. This could be useful for an authorizing node to confirm the identity of other authorizing nodes that are required to authorize the code segment. In some examples, this also includes identifying if the other authorizing node has, in fact, made the authorization (or delegated the authorization) to execute the code segment.

In some examples, the system may restrict providing the identification results of the query to nodes that are stakeholders to the specified shared code segment. For example, the system may restrict the results to the authorizing nodes that authorize the specified shared code segment and/or the executing node(s) that executes the specified shared code segment. This may be useful to maintain privacy of the nodes that are involved. In further examples, a larger set of nodes may have permission to receive results of the query, such as nodes that have permission from the authorizing nodes and executing node(s) in the specified shared code segment. In some examples, privacy may be maintained by encryption of at least part of the data in the specified shared code segment so that only specified nodes can access information about one or more other nodes associated with the specified shared code segment.

However it is to be appreciated that in some alternatives, any nodes can perform the query and receive results for transparency.

In some examples, the executing nodes or authorizing nodes may perform this query to identify authorizing nodes that have not yet provided authorization or delegation, or those nodes that make inputs/outputs during execution of a code segment. Identification is useful as this may assist in directing requests for such nodes to take these actions. In some examples, the system may restrict executing nodes from executing the specified code segment (or even other code segments in the program code) unless the authorizing nodes are identified, or can be identified.

In further examples, nodes may also query executing nodes that are required to commit as a committing node(s) for execution of a specified shared code segment. In some further examples, this includes identifying executing nodes that have not provided commitments. This will assist nodes in identifying such executing nodes so that requests may be sent to such executing nodes to commit.

Querying the system for information to identify the authorizing and executing nodes described above may include different forms. In some examples, this may include the nodes analysing the shared code segment(s) (and/or the broader program code) to identify these nodes. This may include analysing the record on the distributed ledger. For example, analysing the valid shared code segments 161 recorded on the distributed ledger, where the valid shared code segments specify the authorizing nodes. In other examples, this may include analysing the record of the execution of shared code segments 162 on the distributed ledger, since the execution of a preceding shared code segment may (in some examples) define relevant nodes for a subsequent shared code segment in the program code.

In yet other examples, the authorizing nodes and/or executing nodes may query and analyse a copy of the shared code segment and/or program code from their own respective database(s). In further examples, the nodes may query from databases of other nodes in the system that has data associated with the specified shared code segment. In yet another alternative, the node may access data associated with the specified shared code segments from a data source outside of the system.

In certain examples, as detailed more fully below, the execution of a shared code segment can fail if, upon querying the system for information to identify the authorizing and execution nodes, any executing node determines that all appropriate authorizations to execute the shared code segment have not been provided (e.g. as part of a proposed transaction).

Jointly Executable

In many distributed shared systems, code is often executed by multiple nodes resulting in redundant executions of code. In contrast, in the present disclosure the shared code segments may be jointly executable. By this it is meant that the shared code segments can be executed by one of the executing nodes as well as more than one. In most cases a shared code segment would be executed, and the obligation to execute the shared code segment can be satisfied by the node that actually executes the shared code segment. In the typical example, the other executing nodes therefore may not have the obligation to execute the shared code segment. In some examples, the failure of a node to properly execute a shared code segment may be rectified by another executing node (properly authorized) executing the shared code segment. In alternative examples, the execution of a shared code segment by a single node does not satisfy the obligation to execute the shared code segment. For example, a shared code segment may require all the authorizing nodes of the shared code segment to execute the shared code segment.

It is possible for a non-executing node to validate the execution of a shared code segment. So if a non-executing node at any point wanted to validate the execution of a shared code segment, then the non-executing node may execute the shared code segment and validate the execution by matching the output against the corresponding execution entry on the distributed ledger. This may include an auditor node to determine the validity of shared code segments or execution of shared code segments.

Specified Execution Conditions

Shared code segments may have specified execution conditions, which specify the conditions on which a shared code segment may be executed. Typically, code segments in the proposed shared system can have some execution condition, which by default can generally be an authorization for execution from the authorizing node or nodes. A specified execution condition therefore can be an extension of this execution condition to be a specified execution condition. Specified execution conditions might be as simple as a condition on a second shared code segment whereby the first shared code segment must be executed before the second shared code segment can be executed.

However, the specified execution conditions can be more complex. For example, there may be two shared code segments (Y, Z) that have a specified execution condition for shared code segment X to be executed first. The two shared code segments Y and Z do not depend on each other so they can be executed independently, but they both must only be executed after shared code segment X is executed. A further shared code segment W may have a specified execution condition that Y and Z must be executed first. In which case, W has to wait until both shared code segments have been executed. The specified execution condition may have atomicity, in that if X and Y are to executed, then both X and Y should be executed or neither X nor Y is executed.

Specified execution conditions can be more than just related to the execution of other code segments. In essence, a specified execution condition can be any condition that must be satisfied for the execution of a code segment. Conditions may be pre-conditions, which are satisfied prior to execution; contemporaneous conditions, which are satisfied during execution; and even post-conditions, where a shared code segment may be executed by an executing node, but considered to have been not executed if the execution post-condition is not satisfied.

In some examples, the execution conditions can require that shared code segments be rejected if they allow a shared process to create an authorization, delegation, or commitment without the authorizing, delegating, or committing node's authorization. That is, some example execution conditions can reject authorization and execution of shared code segments that leads one or more first nodes to put a second node in a state of authorization, delegation, or commitment without authorization or pre-authorization from the second node.

In some examples, the execution conditions can require that shared code segments be rejected if they may lead to a shared code segment of the shared process for which execution conditions cannot be determined to be true or false. In further examples, the execution conditions can require that shared code segments be rejected if they may lead to a shared code segment of the shared process for which execution conditions cannot be determined to be true or false without using more than a specified requirement of system execution resources (e.g. limit on memory usage or number of program instructions executed).

In some examples, the execution conditions can require that shared segments be rejected if they allow an authorization process to reveal a shared segment to authorizing nodes that are not authorizing, delegating, or committing the revealed shared segment, or that are not authorized, or delegated to authorize the revealed shared segment. In some examples, the execution conditions can require that shared segments be rejected if they allow an authorization process to reveal a shared segment to executing nodes that are not authorized, or delegated to execute the revealed shared segment.

In some examples, the execution conditions can require that shared segments be rejected if they allow an authorization process to reveal input or output data to authorizing nodes that are not authorizing the revealed input or output data, or that are not authorized to authorize the revealed input or output data. In some examples, the execution conditions can require that shared segments be rejected if they allow an authorization process to reveal input or output data to executing nodes that are not authorized, or delegated to input or output the revealed data.

An exemplary (e.g. DAML) execution condition is to fail execution of a first code segment because execution of subsequent code segments would lead to a subsequent delegated or committed code segment rejection because one or more first nodes puts a second node in a state of authorization, delegation, or commitment without authorization or pre-authorization from the second node (e.g. in a request by the second node). This concept is described in example implementations in more detail below.

Requests and Actions

An authorizing node may request other nodes to perform an action, as well as request other nodes to accept an action proposed by the authorizing node. The request may take various forms, but the request can comprise an authorization, a delegation, or a commitment by the other node or authorizing node, or can comprise execution of one of the code segments.

Authorization

An authorization can be similar to the authorization as described above, except in this case the node can grant authorization to perform the action.

Delegation

A delegation can be where the node gives control of execution to the other node for performing the action. An executing node, for example, may delegate the actual execution of a shared code segment to another node. An example of delegation can be a first node authorizing a delegating shared segment to itself authorize execution of one or more subsequent shared segments by a second node. In another example, delegations can be combined and a first node may authorize a first delegating shared segment to authorize execution of one or more subsequent shared segments by a second node. The second node may then authorize a delegating second shared segment (subsequent to the first delegating shared segment) to then authorize execution of one or more subsequent shared segments by a third node (a subset of the first one or more subsequent shared segments).

Commitment

A commitment may be requested by a node, and given by the other node, to perform an action or a node may simply give a commitment without being requested. Typically, the commitment can be in relation to execution of one of the shared code segments. However, the commitment can be in relation to any action performed by the other node. This includes an I/O required for an external computation, whereby for example, an authorizing node may commit to providing a node external to the system with authorized input data by which the node performs a computation to achieve a result. The authorizing node may similarly commit to provide that result back to the executing node so that execution may continue.

An example commitment can be a first node authorizing a committing shared segment to commit the first node to subsequently authorize execution of one or more subsequent shared segments by a second node. In another example, a first node authorizes a first committing shared segment to commit the first node to subsequently authorize execution of one or more subsequent shared segments by a second node. The second node may then authorize a second committing shared segment (among the of one or more subsequent shared segments) to commit the first node to subsequently authorize execution of one or more subsequent shared segments by a third node.

Commitment and Delegation

A shared segment may be both committing and delegating. An exemplary delegating and committing shared segment construction in DAML is the 'await' where a first authorizing node (or executing node with authorization from an authorizing node) delegates specific subsequent execution (which may be subject specific execution conditions) to a second authorizing node and where the first node also commits to the second node to authorize the second node's subsequent execution (where authorization is conditional to specific execution conditions).

Subsequent Requests

In some more complex examples, the actions may be requests to other nodes. For example, one node may request another node to subsequently request a third node to execute a shared code segment. Actions that are requests are referred to in this disclosure as subsequent requests. Subsequent requests may be any of the requests as per above such as authorization, delegation or commitment. This may include, for example, the delegation of authorization where a node N authorizes N2 to execute a shared code segment. N2 may delegate execution to another node N3 so the execution of the code segment is authorized by N2, but the execution of the shared code segment is also authorized by N which occurs because of the initial authorization of N2 by N to execute the shared code segment.

Rewriting Shared Code Segments

The shared system 100 can be adapted to allow rewriting shared code segments. Rewriting in this context does not mean replacing shared code segments if an immutable distributed ledger is utilized. In such circumstances, it is possible though to rewrite a shared code segment by adding a new shared code segment to the immutable distributed ledger where the new shared code segment overrides the old one.

Rewriting shared code segments may comprise rewriting the entire shared code segment and in effect replacing the entire shared code segment. Rewriting may also comprise providing one or more modified parameters to an existing data object used within shared code.

Sequence of Operations for Authorization Examples

The following are example sequences of operations that can be used to execute shared code segments. They are intended to describe the operations of the distributed privacy-preserving shared execution system. They are not to be taken as a strict ordering of operations as a person skilled in the art would understand there are many possible sequences of operations, arrangements and implementations.

Figure 4:
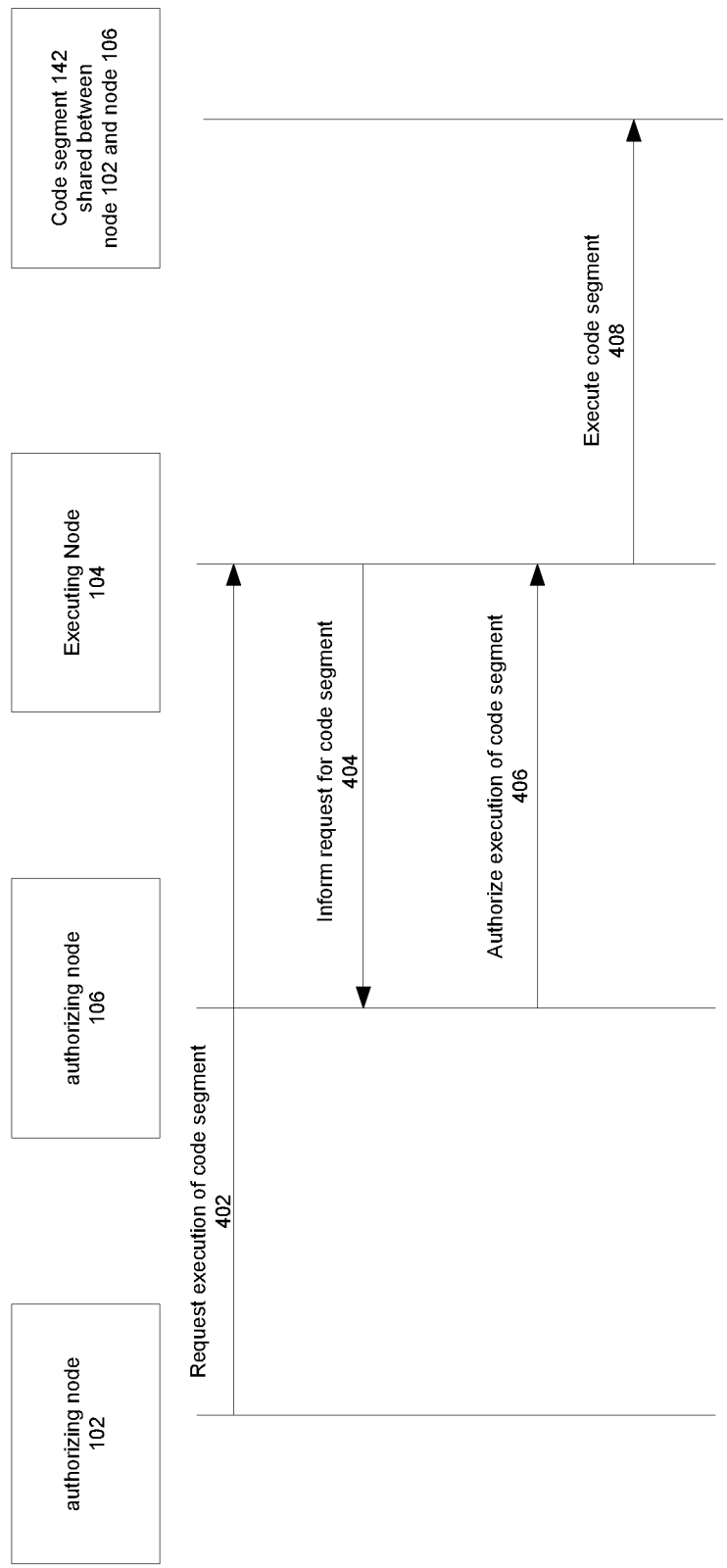
FIG. 4 is a diagram illustrating a sequence of operations to authorize and request execution of a code segment shared between two authorizing nodes and executed by an executing node.

FIG. 4 shows an example sequence of operations in order to execute a shared code segment 142 that is shared between the nodes 102 and 106. In this example, the authorizing nodes are 102 and 106, and the executing node is 104.

The first step can be for the authorizing node 102 to request 402 execution of the shared code segment 142. The executing node 104 can then determine that as authorizing node 106 is the other authorizing node, authorization from authorizing node 106 is required. The executing node 104 can then inform 404 the authorizing node 106 that execution of the shared code segment 142 has been requested. The authorizing node 106 can approve this request by authorizing 406 the execution of the shared code segment 142, which is communicated back to executing node 104. If the authorizing node 106 does not approve the execution, then the executing node 104 might not be able to execute the code.

The executing node 104, now having a request of execution from one of the authorizing nodes 102 of the shared code segment 142, and an authorization of execution from the other authorizing node 106, is able to execute the shared code segment 142. The executing node can then execute 408 the shared code segment 142 as requested.

In this example, the request of execution of a code segment from a node includes an implicit authorization of the execution of the code segment. But this is not necessarily always the case. There may be some scenarios where the request to execute is not impliedly an authorization, and the shared code segment may require a separate authorization from the authorizing node in order to execute the code segment.

Although not shown, the code segment may return a message to confirm a successful execution or an output from the execution to the executing node 104. The executing node 104 may optionally return similar messages to the authorizing nodes 102 and 106 to indicate a successful execution or an output from the execution. The authorizing nodes 102 and 106 may optionally return a confirmation of reception message.

Pre-Authorization of Execution of Shared Code Segment

Figure 5:
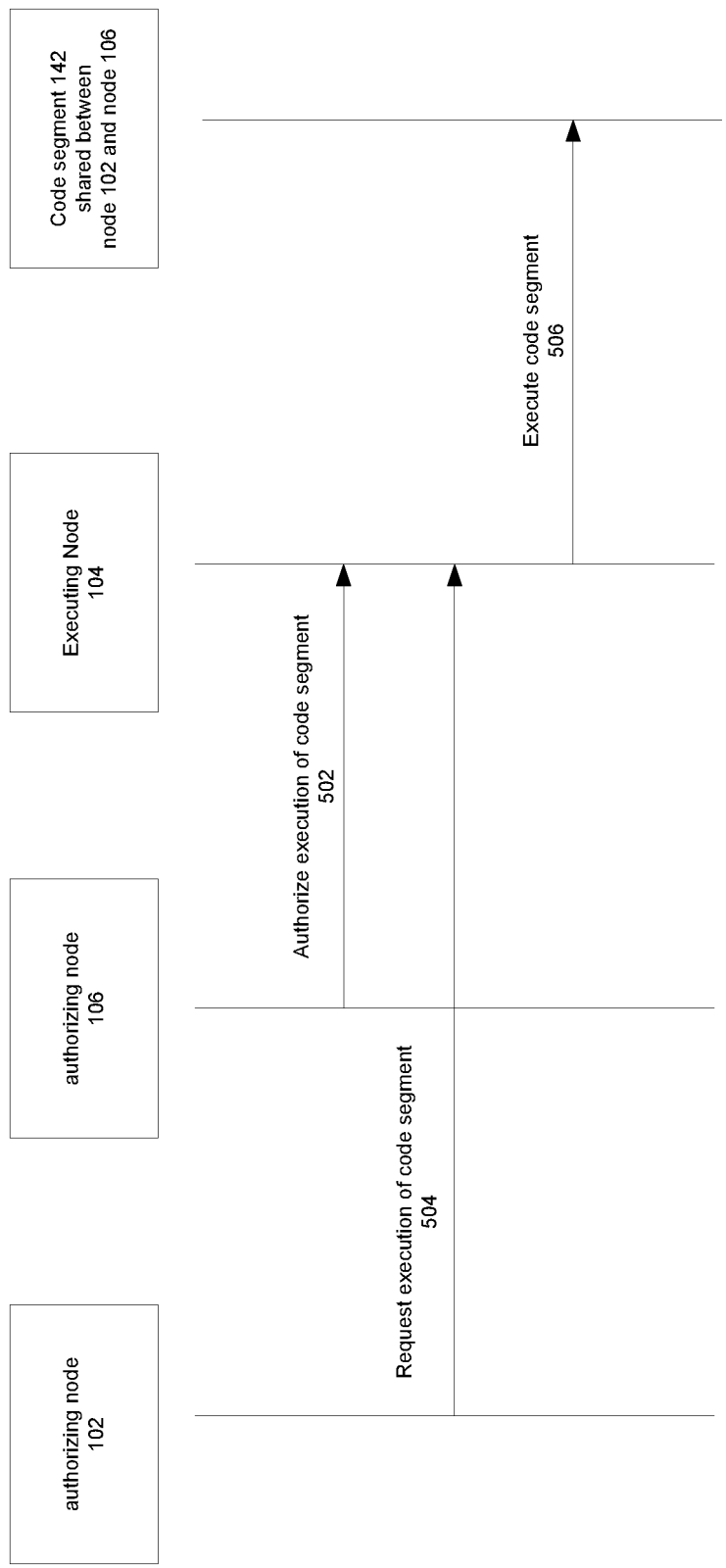
FIG. 5 is a diagram illustrating a sequence of operations including pre-authorization for execution of code by an authorizing node.

FIG. 5 shows an alternative sequence of operations in order to execute the shared code segment 142 that is shared between 102 and 106. In this example, the authorizing node 106 can authorize 502 the execution of the code segment 142 before the authorizing node 102 has requested 504 execution of the code segment 142.

When the executing node 104 receives the request for execution of the shared code segment 142, the executing node 104 can check to see if the shared code segment can be executed. In this case, the pre-existing authorization 502 from authorizing node 106 and the request 504 for execution from authorizing node 102 means that the shared code segment 142 can be executed. In some examples, checking for pre-existing authorization may include checking the distributed ledger for pre-existing authorizations recorded to the distributed ledger.

Multiple Requests for Execution of Shared Code Segment

Figure 6:
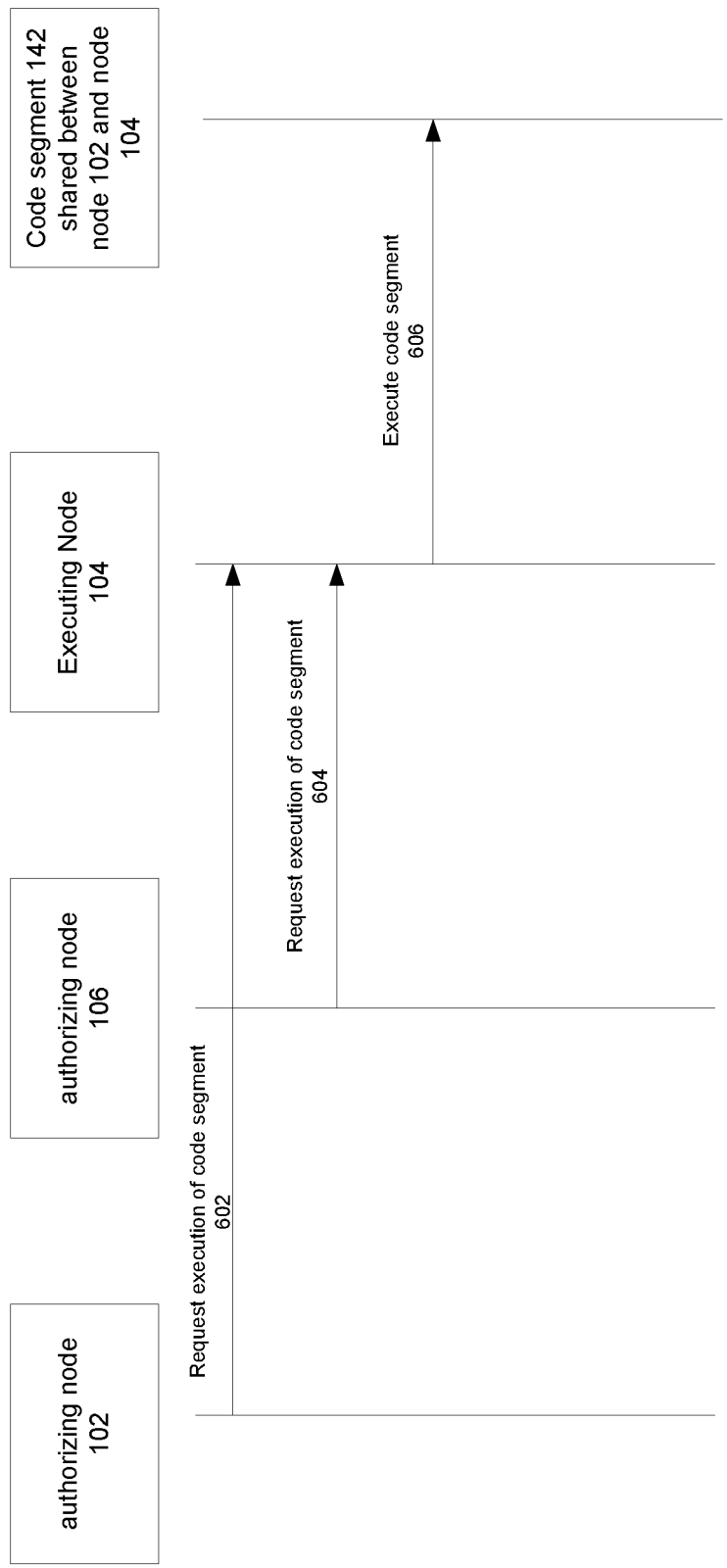
FIG. 6 is a diagram illustrating a sequence operations including receiving multiple requests to execute a code segment.

FIG. 6 shows a further alternative sequence of operations in order to execute the shared code segment 142. In this example, the authorizing node 102 requests 602 execution of the shared code segment 142 and then authorizing node 106 also requests 604 execution of the shared code segment 142. Again, as stated earlier, in this example the request of execution of a shared code segment from a node can include an implicit authorization of the execution of the shared code segment. When the executing node 104 receives the request for execution of the shared code segment 142 from the authorizing node 102, the executing node 104 can check to see if the shared code segment can be executed. In this case, at this point the shared code segment 142 cannot be executed because the executing node has not yet received authorization from authorizing node 106.

Then, the authorizing node 106 can request execution of shared code segment 104. At this point, the executing node has a request for execution from both authorizing nodes 102 and 106, which in effect provide authorization to execute the shared code segment 142. Therefore, the executing node 104 can execute 606 the shared code segment 142.

Executing Multiple Shared Code Segments

Figure 7:
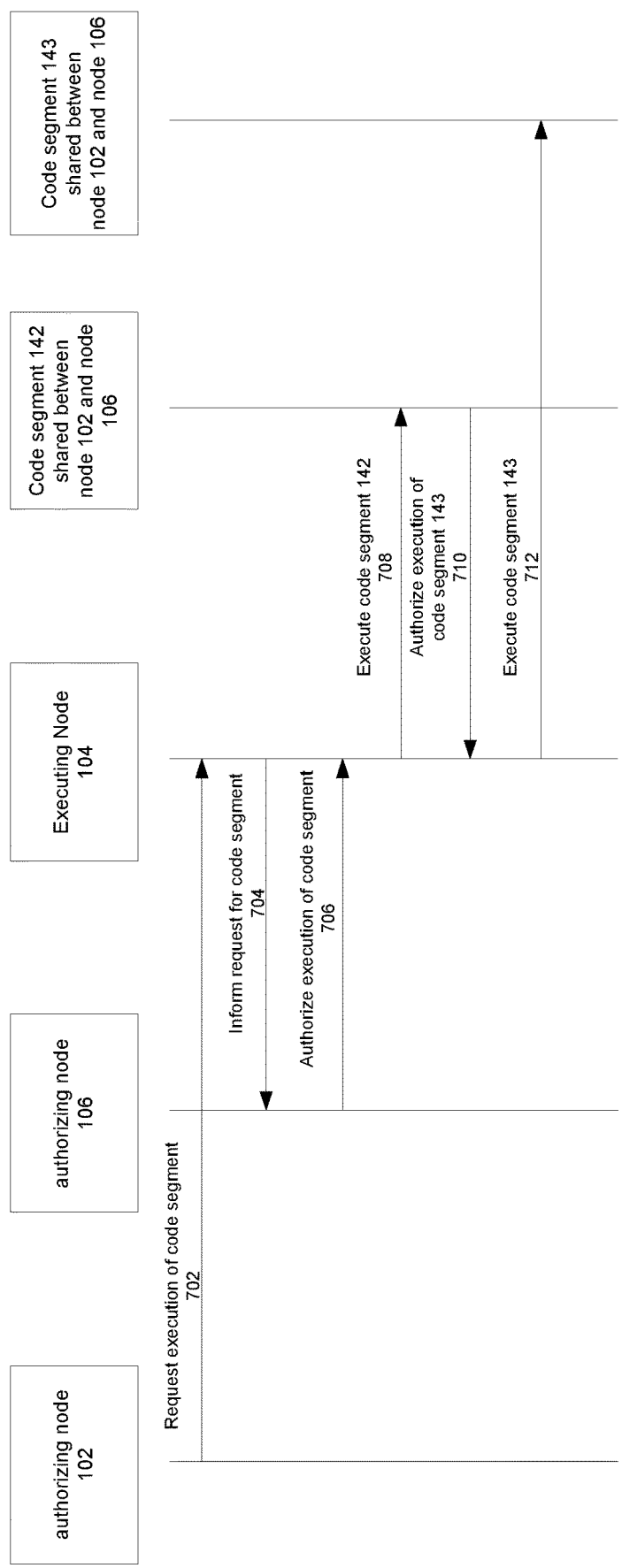
FIG. 7 is a diagram illustrating a sequence of operations to execute multiple code segments.

FIG. 7 illustrates an extended example of a sequence of operations to execute multiple shared code segments 142 and 143. As with the example in FIG. 4, authorizing node 102 can request 702 execution of the shared code segment 142. The executing node 104 can determine that authorization from authorizing node 106 is required as authorizing node 106 is the other authorizing node. The executing node 104 can then inform 704 the authorizing node 106 that execution of the code segment 142 has been requested. The authorizing node 106 can approve this request by authorizing 706 the execution of the shared code segment 142, which can be communicated back to executing node 104.

The executing node 104, now having a request of execution from one of the authorizing nodes 102 of the shared code segment 142, and an authorization of execution from the other authorizing node 106, is able to execute the shared code segment 142. The executing node can then execute 708 the shared code segment 142 as requested.

In this example, the execution of shared code segment 142 can return 710 an authorization for the execution of code segment 143. In an example, this authorization can have an implied request for execution of the shared code segment 143 but as above, there could alternatively be a requirement for an explicit request for execution of the shared code segment 143 by the authorizing node 102 and/or the authorizing node 106. Shared code segment 143 is shared between the same nodes as shared code segment 142 (node 102 and node 106), but in this case the code segment 143 can have a specified execution condition that the shared code segment 142 has been executed and authorized the execution of shared code segment 143. The executing node 104 can check to see whether shared code segment 143 can be executed, and the executing node can determine if the specified execution condition has been satisfied. In this case, the shared code segment 142 has been executed and authorized the execution of shared code segment 143, so the executing node 104 can execute 712 the shared code segment.

It is alternatively possible in this example that the authorization 706 for shared code segment 142 is an authorization function rather than authorization data. When the authorizing node 102 requests execution of shared code segment 143, the authorizing node 102 can communicate the authorization function to the executing node 104. The executing node 104 can then execute the authorization function to authorize the execution of the shared code segment 143. Similarly, the executing node 104 could simply execute the shared code segment 142 before executing the shared code segment 143.

Validation of Execution

Figure 8:
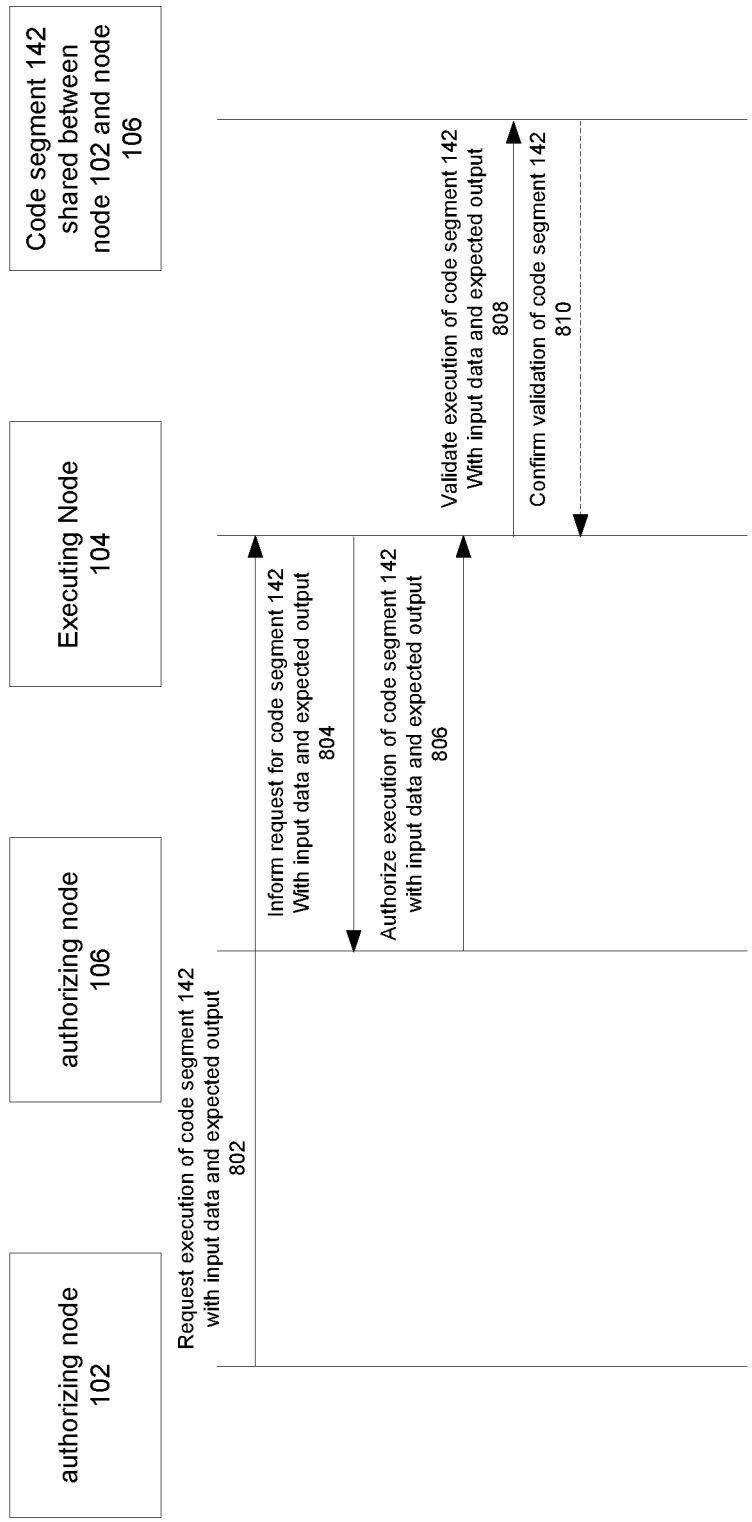
FIG. 8 is a diagram illustrating a sequence of operation to validate execution of a shared code segment.

FIG. 8 illustrates an example of how validation of execution may operate. In this example, the authorizing node 102 can request 802 execution of shared code segment 142 and can share with the executing node 104 the authorized input data and the expected authorized output of the execution. Similar to the example in FIG. 4, the executing node 104 can then inform 804 authorizing node 106 of the request to execute the shared code segment 142. In this example, the executing node 104 can pass on the authorized input data and expected authorized output of the execution that the executing node had received from the authorizing node 102.

Once authorizing node 106 has been informed of the request for execution of the shared code segment 142, the authorizing node 106 can authorize the execution. In this example, the authorizing node 106 can authorize 806 the execution and then the executing node 104 can validate the execution of the shared code segment 142. This may occur by utilizing the authorized input data and expected output of the code segment to compare the expected output with the actual output of the execution of the shared code segment 142. If the expected output is the same, the shared code segment 142 can be confirmed 810 to be validated.

If the validation of the shared code segment 142 fails, then the executing node 104 can flag that the validation has failed using a failed validation protocol, which can include notifying other nodes in the shared system. This may include notifying the authorizing nodes 102 and 106 themselves, the operator or operators of the shared system, auditors, any regulatory authorities, or any other interested party.

It should be noted that any node can validate the execution of a shared code segment if the node is aware of the expected output. An authorizing node, for example, could validate the execution by comparing the expected output with the actual output of the segment provided by the executing node. In some cases, the expected output can be determined by executing the shared code segment such that the executions of the shared code segments can be compared. In many cases, the same output from multiple executions of the shared code segment may be sufficient to validate the execution of the shared code segment.

It is possible in some scenarios for an authorizing node to execute a shared code segment without authorization of any authorizing nodes. This would generally just be for the purposes of validation and not for the (recognized) execution of a shared code segment. That is, an executing node may register the execution of a shared code segment by appending an entry on the distributed ledger. This causes the nodes in the shared system to recognize the shared code segment as executed. An authorizing node may execute the shared code segment for validation, but might not append an entry on the distributed ledger, instead comparing the result with the entry on the distributed ledger which is used for validation.

Exemplary Implementation of Shared Execution of Authorized Code Segments Using a Distributed Ledger A detailed exemplary implementation for shared execution of authorized code segments is set forth below, using at least some of FIGS. 4-8 as reference points, along with FIGS. 15-20. It is to be understood that the implementation is merely exemplary.

As shown in FIG. 8, an authorizing node 102 can request 802 execution of a code segment 142 shared between authorizing nodes 102, 106. In an example, the authorizing node 102 can transmit the request 802 to an executing node 104. The request 802 may or may not include input data and an expected output. It is to be understood that the exemplary implementation below is discussed with reference to the code segment 142, the authorizing nodes 102, 106, and the executing node 104, but that in other processes other nodes and code segments can be involved, as can be appreciated by a person of skill in the art. For instance, FIG. 7 illustrates the execution of multiple code segments 142, 143.

In an embodiment, the request 802 can comprise a message that is cryptographically signed by the authorizing node 102. The cryptographic signature can be a digital signature that utilizes symmetric, asymmetric, or other cryptographic techniques (e.g. RSA) to provably sign at least part of the request 802 so that a recipient node can verify the request (or part thereof) 802's authenticity. In a particular example, the authorizing node 102 can cryptographically sign a portion(s) of one or more tree data structures (e.g. a Merkle tree(s)) that are included with the request 802, which can be connected or overlapping. The authorizing node 102 can also cryptographically sign sub-transaction data (e.g. encrypted sub-transaction data) included in the request 802. The sub-transaction data can be representative of a proposed transaction that, by way of the request 802, the authorizing node 102 is submitting for entry into a distributed ledger maintained by a network of nodes, of which the authorizing nodes 102, 106 and the executing node 104 are part.

Figure 15:
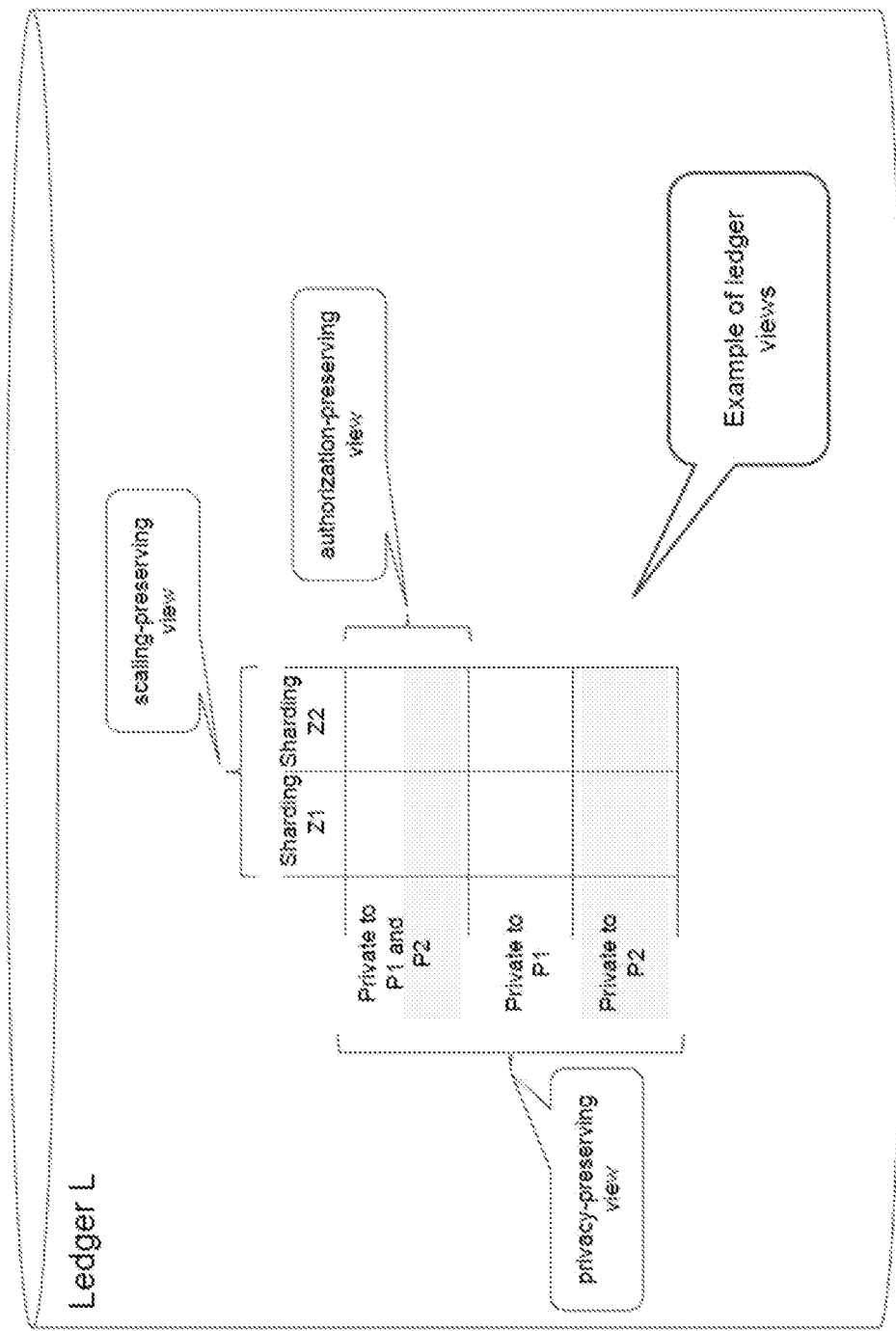
FIGS. 15-18 is an example of the submission of a proposed transaction T2 and the associated execution of shared code segments.

The portion(s) of the tree data structure (e.g., Merkle tree(s)) cryptographically signed by the authorizing node 102 and transmitted by way of the request 802 to the executing node 104 can be constructed in views to maintain privacy between nodes in the distributed ledger network, to provide proper authorization scopes, and to preserve scalability of the network. Each view can be a tree data structure or a portion of a tree data structure (e.g. Merkle tree(s)), which can overlap with other trees. In some examples, the overlapping tree structure can resemble a graph (e.g. a directed acyclic graph). FIG. 15 illustrates the aforementioned views as a privacy-preserving view, a scaling-preserving view, and an authorization-preserving view relative to participant nodes P1, P2, which in an example can be the authorizing nodes 102, 106.

In an example, the tree data structure forming the request 802 can include:

1. A cryptographic representation (e.g. hash) of the state, or part of state, of the distributed ledger prior to the proposed transaction being submitted by way of the request 802. The state, or part thereof, can be representative of the distributed ledger prior to execution of the shared code segment 142 by way of the process of FIG. 8 (or any of FIGS. 4-7). The state, or part thereof, can be included in the request 802 sent to other nodes (e.g. the executing node 104) so that other nodes can validate the authorizing node 102's view of the state of the distributed ledger prior to its proposed transaction, as described more fully below.
2. The proposed transaction payload and/or a proposed step of one or more shared processes, which can include input data to the shared process step. The proposed transaction payload can include multiple proposed sub-transaction payloads that are constructed to preserve privacy, provide proper authorization scopes, and preserve scalability, as described more below with reference to FIGS. 15-18. In an example, a cryptographic representation of the proposed transaction payload and/or the proposed step (e.g. an encrypted version thereof) can be provided with the request 802.
3. A cryptographic representation (e.g. hash) representative of the state, or part of state, of the distributed ledger after the proposed transaction is entered into the distributed ledger. The state, or part thereof, can be representative of the distributed ledger after execution of the shared code segment 142 by way of the process of FIG. 8 (or any of FIGS. 4-7). The state, or part thereof, can be included in the request 802 sent to other nodes (e.g. the executing node 104) so that other nodes can validate the authorizing node 102's view of the state of the distributed ledger after its proposed transaction, as described more fully below.

It should be appreciated that a cryptographic representation of a value or data (as mentioned above) can be that value or date represented in cryptographic form, for example by cryptographically processing the value or data using a variety of cryptographic techniques (e.g. hashing, encryption, salting, etc.) to produce its cryptographic representation. As described more fully in the disclosure, a cryptographic representation of value or data permits nodes in the distributed ledger network to validate proposed transactions before entry into the ledger.

View (1) above can be representative of the state, or part of state, of the ledger pre-transaction. The tree structure or part thereof that constitutes this view might itself include: (i) a cryptographic representation of the state, or part of state, of the ledger specific to different parties to the proposed transaction, (ii) a cryptographic representation of the shared code segments specific to different parties to the proposed transaction, and/or (iii) a cryptographic representation of the data and shared-process sharding views specific to different parties to the proposed transaction.

In the case of (i), the request 802 can contain a cryptographic representation of the state, or part of state, of the ledger specific to the authorizing nodes 102, 106 prior to the proposed transaction. Since the authorizing nodes 102, 106 can be parties to the proposed transaction affected, at least in part, by the shared code segment 142, (i) can be a cryptographic representation of the state, or part of state, of the ledger specific to the authorizing nodes 102, 106 pre-transaction. Of course, if other nodes were involved in the proposed transaction, (i) might include additional cryptographic representations of the state, or part of state, of the ledger specifically between the authorizing node 102 and such other nodes. Stated differently, a cryptographic representation of the state, or part of state, of the ledger pre-transaction can be computed in a privacy-preserving manner between the authorizing node 102 and other nodes that are parties to the proposed transaction, depending upon the view that each node is permitted as part of the proposed transaction.

With respect to (ii), the same is true. In other words, the cryptographic representation of the shared code segments specific to different parties to the proposed transaction can be privacy preserving. That is, using FIG. 8 merely as an example, the cryptographic representation of shared code segment 142 can be specific to authorizing nodes 102, 106 as such nodes are the nodes executing the shared code segment 142. If other shared code segments were being executed as part of the proposed transaction (e.g. as shown in FIG. 7), a cryptographic representation of such shared code segments between the authorizing node 102 and the other nodes participating in the execution of such shared code segments could be computed and sent along with the request 802. The cryptographic representation of shared code segments permits nodes to verify the content of the shared code segment(s) that is to be executed as part of the request 802 (e.g. by comparing a cryptographic representation of the shared code segment(s) calculated by the receiving node (e.g. locally) against the cryptographic representation of the shared code segment(s) provided as part of the request 802).

In the case of (iii), the request 802 can contain a cryptographic representation of the data and shared-process sharding views specific to different parties to the proposed transaction. In an example, the request 802 can contain a cryptographic representation of the shared code segment 142 that is specific to the shard(s) the shared code segment 142 resides on within the distributed ledger network, and a cryptographic representation of any data necessary to execute the shared code segment 142 specific to the shard(s) the data resides on.

View (2) of the request 802 can comprise the proposed transaction payload, which itself can include multiple proposed sub-transaction payloads (sometimes referred to as DAML actions) that are constructed to preserve privacy, provide proper authorization scopes, and preserve scalability. A sub-transaction payload or an action can be a computation that at least in part causes a state transition for the ledger, and/or that other nodes can utilize to verify proposed or actual state transitions to the ledger. That is, one or more sub-transaction payloads or actions can together, in the aggregate, at least partly cause a state transition of the ledger to occur from a first state pre-transaction to a second different state post-transaction. Alternatively, one or more sub-transaction payloads or actions can together, in the aggregate, be used by other nodes to verify proposed or actual state transitions to the ledger. A sub-transaction payload or an action can, merely as non-limiting examples, include:

1. Creating, adding, or activating a shared code segment between one or more nodes.

Such an action can cause a shared code segment to become active between the one or more nodes for reference and execution by another part of a proposed transaction, for execution in a subsequent transaction, for reference by other shared code segments for valid execution of such other shared code segments, or for other reasons.

2. Executing a shared code segment.
3. Providing input data as part of (1) and/or (2) above. The input data can be parameters needed to execute a shared code segment, or other input data.
4. Providing output data (e.g. as part of (2) above). The output data can be used, in an example, to certify the output, or intermediate output, of execution or partial execution of a shared code segment or the proposed transaction.
5. Creating or adding a shared code segment class or template. The shared code segment class or template can be used to create, add, or activate shared code segment instances, be referenced by other shared code segment classes or templates, or for other uses.
6. Archiving shared code segments or shared code segment templates.
7. Capturing state, or part of state, of the ledger at specified intermediate execution moments of the proposed transaction. This can be useful for other nodes to certify or validate the intermediate execution moments as part of execution of a shared code segment and/or the proposed transaction.

View (2) of the request 802 can include privacy-preserving sub-transaction payloads or actions that are part of the proposed transaction sent with the request 802. In an example, the authorizing node 102 sending the request 802 can construct privacy-preserving sub-transaction payloads for other nodes that are parties to the proposed transaction. In the example of FIG. 8, the authorizing node 106 is the only other node that is a party to the proposed transaction that is part of the request 802, so any sub-transaction payloads or actions provided as part of view (2) of the request 802 may be privacy-preserving to the authorizing nodes 102, 106. However, in other examples additional nodes can also be parties to the proposed transaction sent as part of the request 802. In such cases, the authorizing node 102 can group different sub-transaction payloads or actions together on a party-specific basis. For instance, the authorizing node 102 can group different sub-transaction payloads or actions together that affect a first subset of nodes to the proposed transaction as a first group, and can group different sub-transaction payloads or actions together that affect a second subset of nodes to the proposed transaction as a second group. In an example, the authorizing node 102 can send separate cryptographic representations of the first and second groups of sub-transaction payloads or actions along with the request 802 so that the first subset of nodes is not able to view or act on the second group of sub-transaction payloads or actions, and the second subset of nodes is not able to view or act on the first group of sub-transaction payloads or actions. For instance, the authorizing node 102 can encrypt the first and second groups of sub-transaction payloads or actions, where the first subset of nodes has a decryption key for the first group of sub-transaction payloads or actions but not the second, and the second subset of nodes has a decryption key for the second group of sub-transaction payloads or actions but not the first. In this way, certain sub-transaction payloads or actions within a proposed transaction can remain private from different subsets of nodes that may be involved in a proposed transaction if such nodes should not have access to specific sub-transaction payloads or actions.

The tree data structure of view (3), that is sent as part of the request 802, can include a cryptographic representation of the state, or part of state, of the distributed ledger after the proposed transaction is entered into the distributed ledger. In an example, the tree data structure can include sub-parts (i) to (iii) detailed above with respect to view (1), but for the post-transaction state, or part of state, of the ledger. Thus, it is to be understood that any of sub-parts (i) to (iii) described above for view (1) can be included for view (3), but for the post-transaction state, or part of state, of the ledger. As detailed more fully below, similar to view (1), the tree data structure of view (3) included as part of the request 802 can be utilized by other nodes to validate the authorizing node 102's view of the state, or part of state, of the ledger post-transaction. In an example, such validation can be effective in allowing other nodes (e.g. authorizing node 106) to undertake execution of any shared code segment(s) (e.g. shared code segment 142) only after performing necessary validation checks.

The preceding illustrates the parts of the request 802 that can be sent by the authorizing node 102 in requesting execution of a shared code segment(s). FIGS. 15-18, along with FIGS. 7-8, are now discussed to illustrate an execution process for a shared code segment(s), according to an example of the disclosure.

FIGS. 15-18 illustrate an example of views (1) to (3) of the request 802 described above specific to participant nodes P1, P2 and shared code segments SS5-SS13. In FIGS. 7-8, the participant nodes P1, P2 are referred to as authorizing nodes 102, 106 because such nodes are authorizing execution of a shared code segment(s) 142, 143. The remainder of the disclosure below uses nodes P1, P2 and the authorizing nodes 102, 106 interchangeably as the nodes can conceptually be thought of as the same nodes for purposes of executing shared code segments 142, 143. Additionally, the shared code segments 142, 143, and SS5-SS13 are also referred to somewhat interchangeably as the execution of such shared code segments can follow similar processes (e.g. as set forth in FIGS. 7-8).

Figure 16:
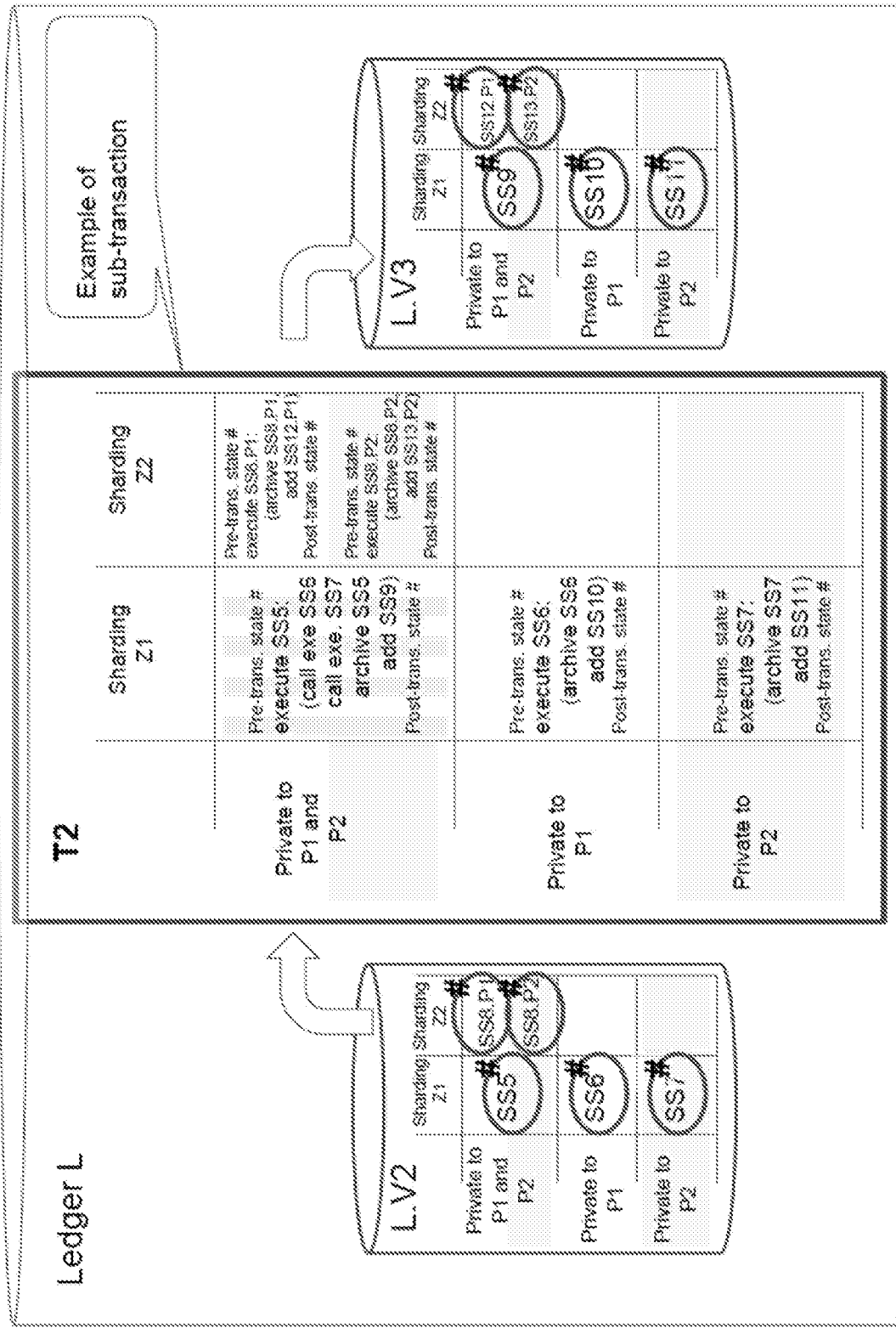
Figure 17:
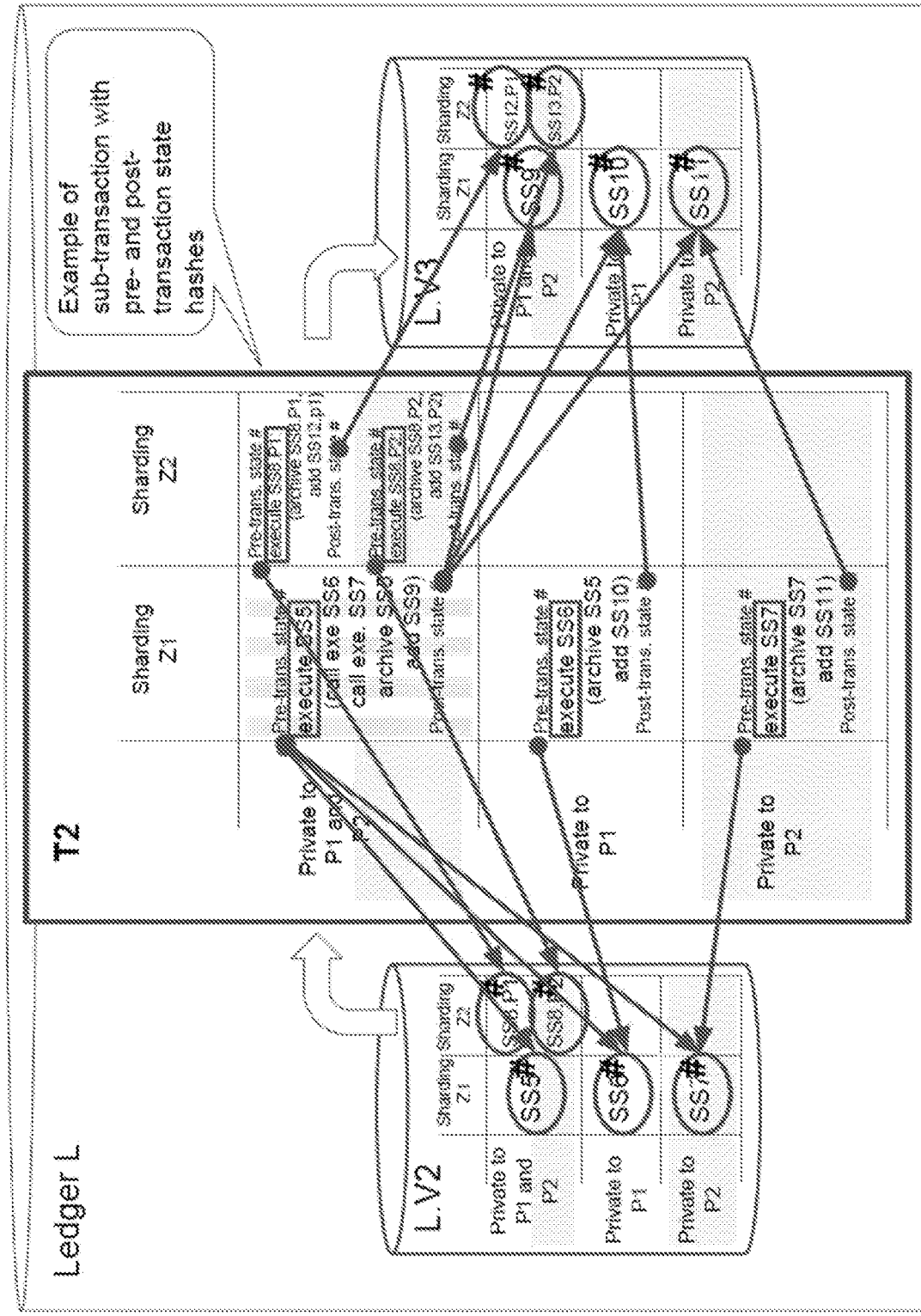
Figure 18:
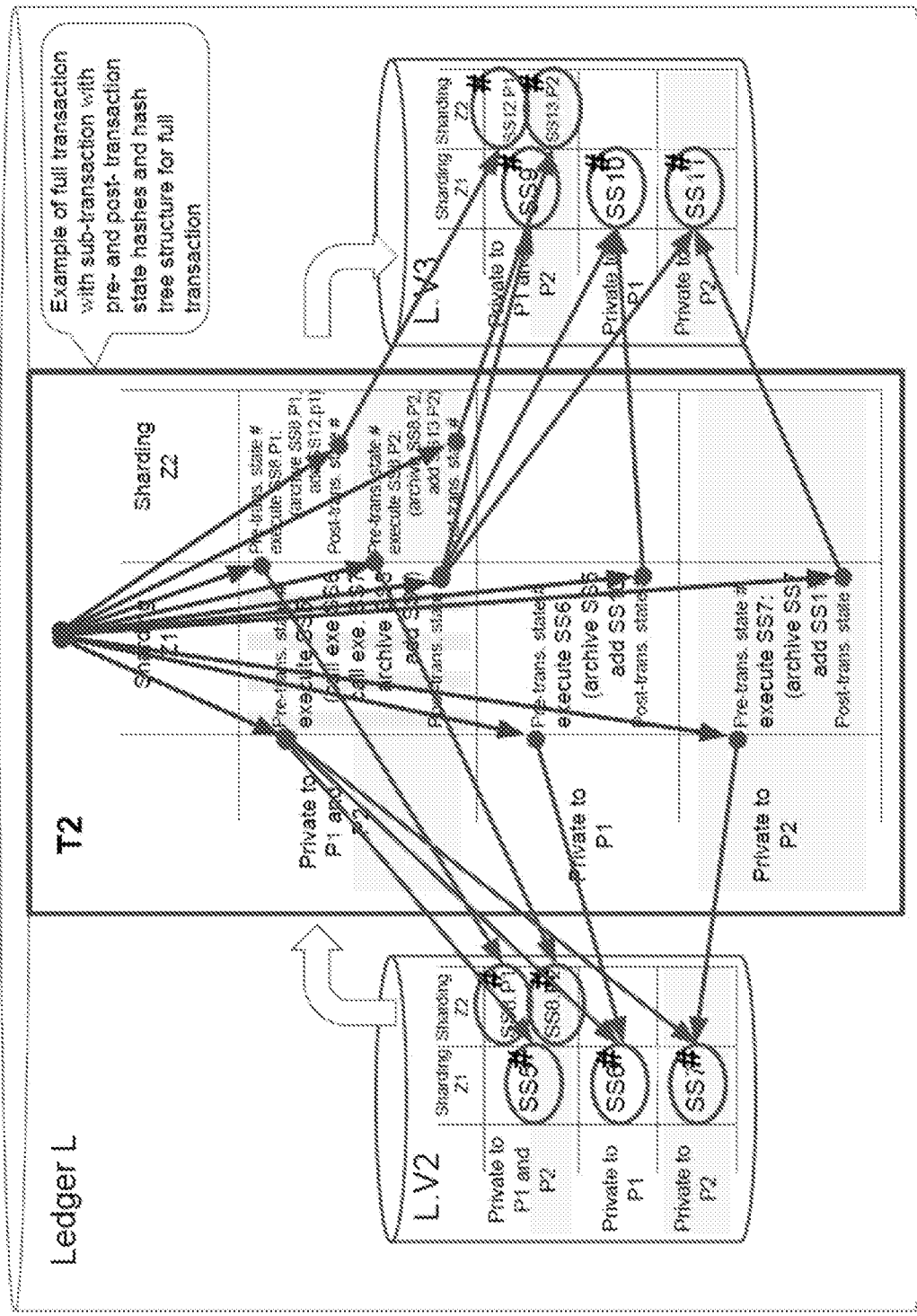

As shown in FIGS. 7-8, the authorizing node 102 can request execution of the code segment 142 by way of the request 702, 802. In FIG. 8, input data and expected output can be provided along with the request 802. FIG. 16 similarly illustrates a proposed transaction T2, which can be sent as part of the request 702, 802. The proposed transaction T2 can contain views (1) to (3) disclosed above constructed in a privacy-preserving, scaling-preserving, and authorization-preserving manner (FIG. 15). Indeed, the proposed transaction T2 can include separate cryptographic representations of the state, or part of state, of the ledger pre and post-transaction T2 specific to the authorizing nodes P1, P2/102, 106, specific to the authorizing node P1/102, and specific to the authorizing node P2/106 (i.e. views (1) and (2) above). The proposed transaction T2 can also include the proposed transaction payload and any proposed step(s) of any shared processes between the nodes to the proposed transaction T2 (i.e. view (3) above). In the case of FIG. 16, view (3) is illustrated as the sub-transaction payloads or actions "execute SS5", "call exe. SS6", "call exe. SS7", "archive SS5", and "add SS9" for the authorizing nodes P1, P2/102, 106. Such sub-transaction payloads or actions, in all boxes of FIG. 16, can be the actions that, in the aggregate, form the proposed transaction T2's payload. In the example of FIG. 16, the sub-transaction payloads or actions specific to the authorizing nodes P1, P2/102, 106 can act to execute shared code segment SS5, which itself acts to call and execute shared code segment SS6, call and execute shared code segment SS7, archive shared code segment SS5, and add or create a new shared code segment SS9 between the authorizing nodes P1, P2/102, 106. The other sub-transaction payloads or actions are self-explanatory as set forth in the boxes of FIG. 16 relative to the different nodes P1, P2/102, 106.

Referring to FIGS. 7-8, in an example the authorizing node P2/106 can be informed of the request 702, 802 to execute a shared code segment(s) 704, 804, and then authorize the execution of the shared code segment(s) 706, 806. FIGS. 7-8 illustrate that the authorizing node P1/102 is requesting execution of the shared code segment 142, but the authorizing node P1/102 can request execution of multiple code segments in other examples. In an example, the authorization 706, 806 of the authorizing node P2/106 to execute the shared code segment(s) can take the form of the authorizing node P2/106 cryptographically signing a portion of the request 702, 802 to authorize execution of the shared code segment(s). For instance, the authorizing node P2/106 can cryptographically sign the state, or part of the state, of the ledger pre-transaction (i.e. view (1)) provided in the request 702, 802, it can cryptographically sign a part(s) of the proposed transaction payload (i.e. view (2)), and/or it can cryptographically sign the state, or part of the state, of the ledger post-transaction (i.e. view (3)).

Further, in an example, the authorizing node P2/106, as part of its authorization 706, 806, can cryptographically sign a subset of the proposed sub-transaction payloads or actions relevant to the authorizing node P2/106, according to privacy constraints. In a manner, this can be seen as the authorizing node P2/106 explicitly authorizing execution of the proposed sub-transaction payloads or actions as part of the proposed transaction T2, by way of its cryptographic signature. In a further example, the authorizing node P2/106 can cryptographically sign any proposed sub-transaction payloads or actions for which another node in the distributed ledger network has delegated its authorization to the authorizing node P2/106. That is, by way of execution of a preceding shared code segment(s), a first node in the distributed ledger network can delegate authorization to execute a subsequent shared code segment(s) that affects the first node's rights or obligations to the authorizing node P2/106. For instance and merely as an example, the first node, in a preceding or in the same transaction T2, could have cryptographically signed a shared code segment(s) (not shown) that, when executed, creates or activates shared code segment SS5. By cryptographically signing the preceding shared code segment(s), the first node can be said to have implicitly authorized execution of shared code segment SS5 as the first node explicitly authorized shared code segment SS5's creation or activation. Thus, the first node can be said to have delegated its authorization to execute shared code segment SS5 to the authorizing node P2/106, which upon cryptographically signing the proposed transaction payload and/or any sub-transaction payloads or actions, can be considered to have authorized the execution of shared code segment SS5 by an executing node 104.

It is notable that, although not shown in FIGS. 7-8, the authorizing node P2/106 can perform certain checks prior to providing its authorization 706, 806 to the executing node 104 to execute a shared code segment(s). For instance, the authorizing node P2/106 can check certain specified execution conditions before providing its authorization 706, 806. In an example, the specified execution conditions can be that the applicable shared code segment(s) has been authorized for execution by all required nodes. This is described in more detail below as non-obligable computation.

After providing proper authorization 706, 806 for execution of any shared code segment(s), the applicable shared code segment(s) can be executing by the executing node 104. In FIGS. 7-8, this would be the execution of shared code segment 142 by the executing node 104. In FIGS. 15-18, this would be the execution of shared code segments SS5-SS7 and SS8.P1-P2. As shown in FIG. 16, the portions in parentheses for shared code segments SS5-SS7 and SS8.P1-P2 can represent the sub-transaction payloads or actions that result from the execution of shared code segments SS5-SS7 and SS8.P1-P2. For instance, the execution of shared code segment SS5 can result in the sub-transaction payloads or actions that call and execute shared code segment SS6, call and execute shared code segment SS7, archive shared code segment SS5, and add or activate shared code segment SS9. Likewise, the execution of shared code segment SS6 with respect to the authorizing node P1/102 can result in the sub-transaction payloads or actions that archive shared code segment SS6, and add or activate shared code segment SS10, which can be private to the authorizing node P1/102. Similarly, on shard Z2 as part of the proposed transaction T2, the execution of shared code segment SS8.P1 can result in the sub-transaction payloads or actions that archive shared code segment SS8.P1 and add or activate shared code segment SS12.P1. As shown in FIG. 16, shared code segment SS8.P1 is private to the authorizing node P1/102 (as illustrated by the white vs. gray background), and the shared code segment SS12.P1 resulting from the execution of the shared code segment SS8.P1 is also private to the authorizing node P1/102.

In FIG. 8, the executing node 104 can validate 808 and confirm the valid execution 810 of the shared code segment 142 and the shared process between nodes 102, 104, 106 can terminate. In FIG. 7, the execution of the shared code segment 142 can itself return 710 an authorization for the execution of code segment 143, which can then be executed in step 712, as described previously. With respect to FIGS. 15-18, the execution of the different shared code segments SS5-SS7 and SS8.P1-P2 is described above, and the ledger can, as a result of the executions and the proposed transaction T2, transition from a first state L.V2 to a second state L.V3. The shared process between the authorizing nodes P1, P2/102, 106 and the executing node 104 (not shown in FIGS. 15-18) can then end.

Non-Obligable Computation

As mentioned above, the authorizing node P2/106 can perform certain checks prior to providing its authorization 706, 806 to the executing node 104 to execute a shared code segment(s). In fact, such checks can be performed by any authorizing node that is a party to a proposed transaction, prior to providing such node's authorizing to execute a shared code segment(s) that is involved in the proposed transaction.

In an example, the authorizing node, prior to providing its authorization to execute a shared code segment(s), can (e.g. locally) compute its view of the state, or part of state, of the ledger pre-transaction and compare it to the state, or part of the state, of the ledger pre-transaction as specified in any proposed transaction. This can take the form of the authorizing node computing a cryptographic representation of the state, or part of state of the ledger, pre-transaction and comparing it to the similar cryptographic representation present in the proposed transaction (e.g. proposed transaction T2 of FIGS. 16-18). The authorizing node can also perform a similar validation for its view of the post-transaction state prior to providing its authorization to execute a shared code segment(s). Such validations can give assurance to the authorizing node that its view of the pre and post-transaction state, or part of state, of the ledger is consistent with the authorizing node submitting the proposed transaction.

Any authorizing node, prior to providing its authorization to execute a shared code segment(s), can also ensure that the execution of such shared code segment(s) satisfies obligable execution conditions. Obligable execution conditions can ensure that no node is, through execution of a shared code segment(s), placed into an obligable position without its authorization. That is, no authorizing node is deemed to have authorized execution of a shared code segment(s) without such authorizing node's explicit or implicit authorization. This concept of non-obligable computation is explored in more detail with a concrete, but merely illustrative and non-limiting example below.

Figure 19:
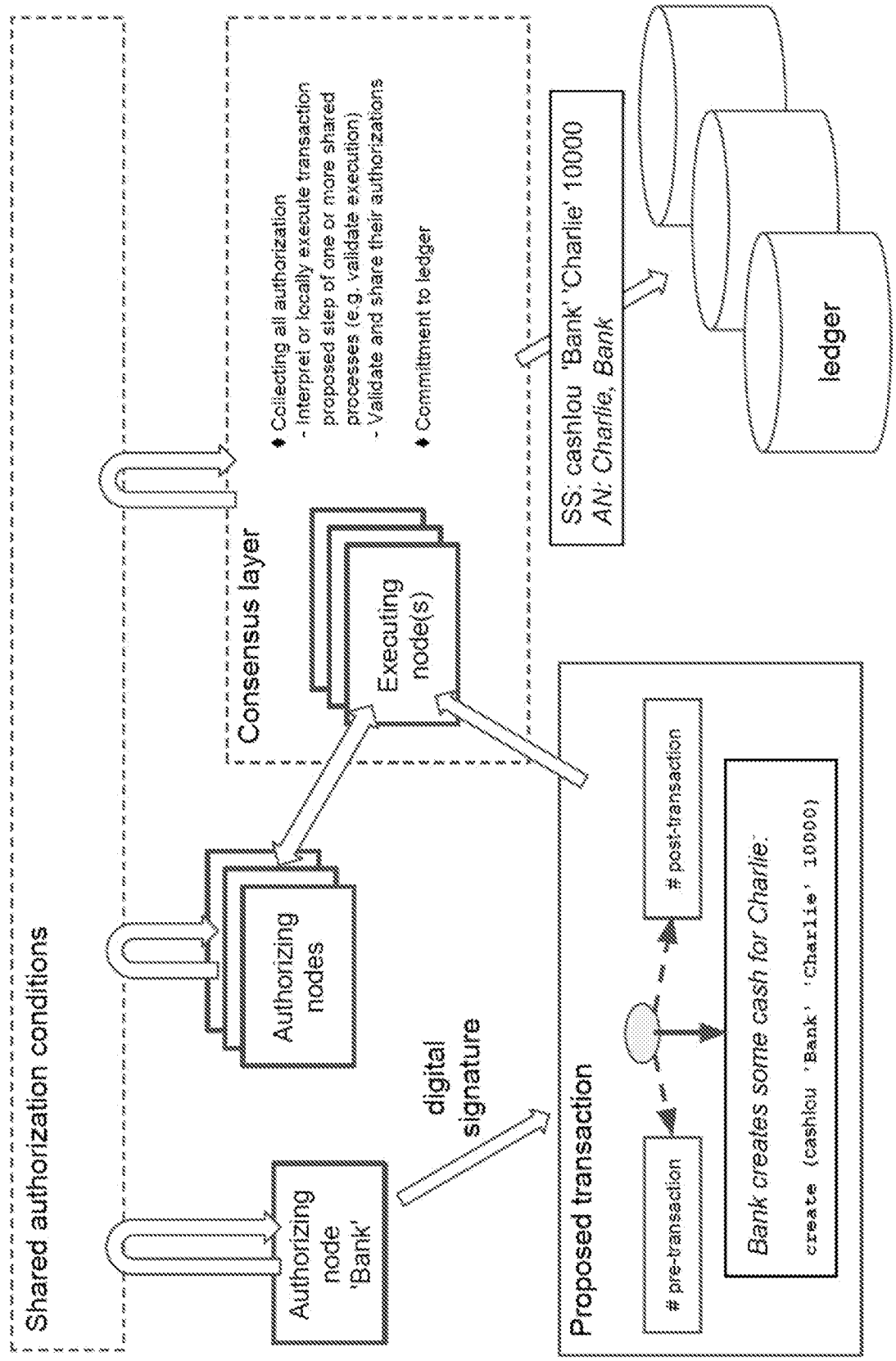
FIG. 19 is an example of a proposed transaction submitted by an authorizing node.
Figure 20:
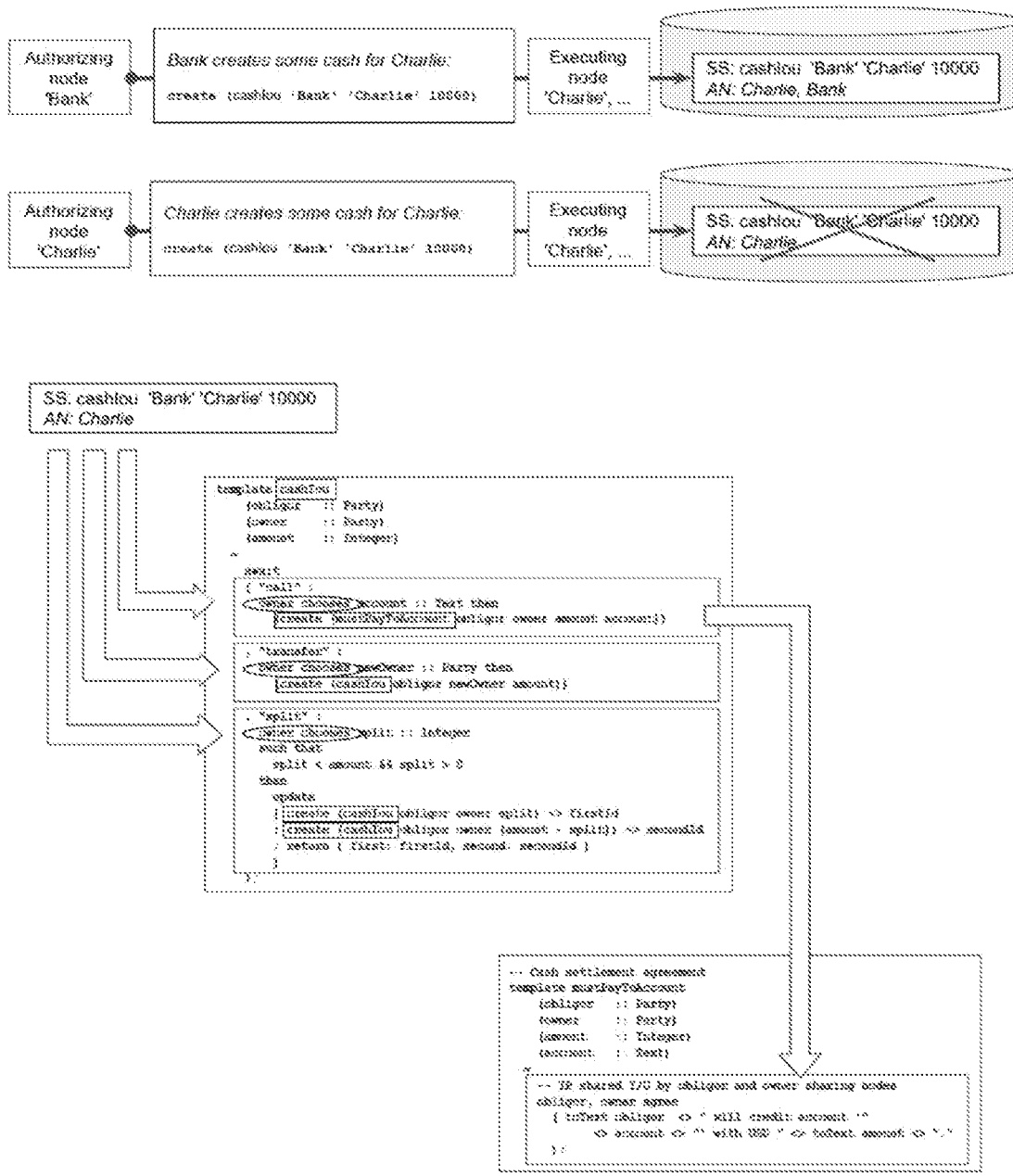
FIG. 20 illustrates examples of a successful and unsuccessful execution of a code segment as part of the proposed transaction of FIG. 19.

FIGS. 19-20 illustrate an example of execution of a shared code segment cashIou. The shared cashIou code segment can be representative of a cash obligation of an obligor (Party) to an owner (Party) for a specific amount (Integer) of cash. In that sense, the shared cashIou code segment represents an obligation of the obligor (Party) that the obligor (Party) shall dispose of the specific amount (Integer) of cash in the manner requested by the owner (Party), as set forth in the "choices" or await blocks of the shared cashIou code segment. As can be appreciated, a particular node in the distributed ledger network would not want a shared cashIou code segment created where such node is defined as the obligor (Party) without such node's explicit or implicit authorization. Non-obligable computation, as specified in the examples of FIGS. 19-20 and more generically above, ensures that such a result is an impossibility. Thus, nodes in the distributed ledger network can be assured that no shared code segment(s) will be created, activated, executed, etc. without such node's appropriate implicit or explicit authorization.

FIG. 19 illustrates an example of a successful execution of a shared cashIou code segment in the form of an instantiation or activation of a shared cashIou code segment from a cashIou class or template (illustrated in FIG. 20). In FIG. 19, an authorizing node Bank authorizes, by way of its cryptographic signature, a proposed transaction that instantiates or creates a shared cashIou code segment between the authorizing Bank node and the owner node, Charlie, in which the authorizing Bank node has a cashIou obligation in an amount of 10000. As shown in FIG. 19, the proposed transaction can include views (1) to (3) discussed previously above—e.g. cryptographic representations of the pre and post-transaction state, or part of state, of the ledger and the proposed transaction payload. Because the Bank node submitted the proposed transaction and cryptographically signed the proposed transaction, which instantiates the shared cashIou code segment, the Bank node can be said to have explicitly provided authorization to the instantiation of the shared cashIou code segment, and implicitly delegated its authorization to the Charlie node to exercise any of the "choices" in the await blocks of the shared cashIou code segment, illustrated in FIG. 20. That is, since the Bank node explicitly authorized the instantiation of the shared cashIou code segment, it also had knowledge of and implicitly authorized the execution of other shared code segments within the new, instantiated shared cashIou code segment. As an example, as shown in the "call" await block of FIG. 20, the Charlie node, by way of the owner chooses code segment, can instantiate a shared mustPayToAccount code segment from a mustPayToAccount template whereby the Bank node credits an account (Text) of the Charlie node's choosing with an amount (Integer) of cash from the Charlie node's original shared cashIou code segment (e.g. some amount equal or less than 10000 or the remaining amount left in the shared cashIou code segment's amount field, whichever is lower).

As such, if the Charlie node as part of the same proposed transaction in FIG. 19, or a different, subsequent proposed transaction, requests the creation or activation of a shared mustPayToAccount code segment by way of the call block, since: (i) the Bank node has implicitly authorized such an action by delegating its authorization to the Charlie node, and (ii) the creation or activation of the shared mustPayToAccount code segment would not place another node in the position of having authorized the shared mustToPayAccount code segment without its explicit or implicit authorization, the creation or activation of the shared mustPayToAccount code segment in this instance would be considered valid by other nodes and would pass authorization validation by such other nodes. With respect to (ii), stated differently, since the instantiation of the shared mustToPayAccount shared code segment does not result in another code segment that places a node in the position of authorizing the execution of such code segment without the node's authorization, condition (ii) can be considered satisfied. For example, in an alternate scenario, the mustToPayAccount template or class could have another code segment that, when executed, would create a second shared cashIou code segment between a second Bank node and the Charlie node. However, in this instance, the fictional other code segment would not have been authorized by the second Bank node since, nowhere in the process of FIG. 19, does a second Bank node explicitly or implicitly authorize the creation or activation of that a code segment that creates a shared cashIou between the second Bank and any other node. This fictional example is provided to more clearly set forth condition (ii) above—i.e. that the execution of a shared code segment (in this case, the execution of the call block of the shared cashIou code segment of FIG. 20 by the Charlie node), in certain examples, does not pass authorization checks by other nodes if the code segment's execution would result in the creation, activation, or execution of another code segment without all necessary authorizing nodes' authorizations.

The same result is also true of the transfer and split choices or code segments that are instantiated upon the creation of the original shared cashIou code segment by the Bank node—e.g. the Charlie node's request for execution of such transfer and split code segments would be considered authorized by other nodes in the network since the Bank node delegated its authorization to execute such code segments to the Charlie node, as described above, and no code segment would be created, activated, or executed without all necessary authorizing nodes' authorizations (in this case, just the Bank node).

As shown in FIG. 19, the proposed transaction that includes the transaction payload to instantiate a shared cashIou code segment can be executed by an executing node after collecting any necessary authorizations, which in this example can be simply the request, with its cryptographic signature, by the authorizing Bank node to activate the shared cashIou code segment. The executing node (e.g. the Charlie node) can then cause the shared cashIou code segment to be entered into the ledger so that the Charlie node can subsequently dispose of the cash represented by the shared cashIou code segment in the manner shown by the "choices" in the cashIou template of FIG. 20.

FIG. 20 illustrates example scenarios where the activation of the shared cashIou code segment described above would be considered authorized and not authorized so as to further detail examples of non-obligable computation. The top example in FIG. 20 represents the successful creation of a shared cashIou code segment when the authorizing node is the Bank node, as more fully described in connection with FIG. 19 above. The bottom example in FIG. 20 represents the unsuccessful creation of a shared cashIou code segment when the authorizing node is not the Bank node and is instead the Charlie node.

In the bottom example (second scenario), the Charlie node can make a request as the purported authorizing node to create a shared cashIou code segment where the Bank node has a cashIou obligation to the Charlie node in an amount of 10000. But, as is apparent in this example, the Bank node has not provided its explicit or implicit authorization to the creation of the shared cashIou code segment. Instead, the Charlie node is the requesting and only authorizing node. If the proposed transaction containing this instantiation of the shared cashIou code segment with the Charlie node as the only authorizing node, authorization checks by the executing node or any other nodes receiving the proposed transaction would fail and the proposed transaction would not be entered into the ledger.

For illustration only, the second scenario above would result in the creation of a valid shared cashIou code segment between the Bank node and the Charlie node if the Bank node provided its explicit authorization (e.g. by cryptographically signing the proposed transaction or a portion thereof), or its implicit authorization. In the latter case, the Bank node's implicit authorization can come in the form of the Bank node explicitly authorizing the execution of a prior shared code segment that, when executed, creates or instantiates the shared cashIou code segment between the Bank node and the Charlie node.

In some sense, non-obligable computation can involve all authorizing nodes validating shared authorization conditions, as shown for example in FIG. 19, prior to authorizing execution of a shared code segment(s). In an example, as part of validating shared authorization conditions, all authorizing nodes can validate that any combination or permutation of the following shared execution conditions are satisfied:

1. That any delegated or committed authorization is traceable back to a delegating or committing node that requested the delegated or committing authorization by way of a preceding transaction proposal request. In the above example that successfully creates a shared cashIou code segment, this shared execution condition is satisfied since the Bank node's committed authorization that commits the Bank node to a cashIou obligation in the shared cashIou code segment to the Charlie node is traceable back to the Bank node's transaction request as the authorizing node in FIGS. 19-20, and its delegated authorizations to the Charlie node to execute any of the code segments (i.e. "choices" in the await block of FIG. 20) is traceable back to the Bank node's transaction request as the authorizing node.
2. That all delegated or committing authorizations include a cryptographic authorization (e.g. cryptographic signature) of the respective delegating or committing node authorizing a request for the relevant delegated or committing authorizations. In the example above, this shared execution condition is satisfied because the delegated and committed authorizations of the Bank node are traceable back to the Bank node's cryptographic authorization (e.g. cryptographic signature) on its request for the proposed transaction in FIG. 19.

3. That any possible execution result stemming from execution of any code segments created, activated, or executed by any shared code segment(s) executed in the proposed transaction satisfies shared execution path conditions. In an example, all authorizing nodes can validate that any combination or permutation of the following shared execution path conditions are satisfied:

a. That any possible execution result stemming from execution of any code segments created, activated, or executed by any shared code segment(s) executed in the proposed transaction is traceable to a cryptographic authorization (e.g. cryptographic signature) from all required authorizing nodes. In the example above, this shared execution path condition is satisfied since any possible execution result stemming from execution of the "call", "transfer", and "split" shared code segments created or activated by the instantiation of the shared cashIou code segment in the proposed transaction of FIG. 19 is traceable to a cryptographic authorization from all required authorizing nodes, in this case just the cryptographic authorization (e.g. cryptographic signature) of the Bank node that requested the proposed transaction. In some sense, this shared execution path condition can ensure that all future execution states of any shared code segment(s) is authorized by appropriate authorizing nodes. Thus, nodes in the distributed ledger network can be assured that it is an impossibility for any node to be placed into a future unauthorized execution state.

Certified Verification

In an example, nodes performing authorization checks as described above to comply with non-obligable computation can do so by performing execution checks prior to providing authorization to execute a shared code segment(s). A difficulty in distributed systems subject to authorization rules (e.g. access control, execution, business authorization, smart contract rules) can be that participating systems might violate authorization rules and authorize inconsistent actions, and this difficulty may be compounded by difficult and expensive checks needed by each participating system to pre-check the appropriateness and validity of authorizing the execution of program code steps that fulfills specific shared process steps.

Here, certified verification can be used as a means to ensure valid and trusted authorized execution in the distributed ledger network. Certified verification can combine runtime verification, static verification, and additional cryptographic, certification, and authorization information to ensure non-obligable computation constraints are satisfied. Runtime verification is a computing system analysis and execution approach where information is extracted from a running system and used to detect and possibly react to observed behaviors satisfying or violating certain properties, in this case non-obligable computation constraints described above. In a distributed system, each system can be set up to progress from one well-defined state to the next well defined-state. In a distributed runtime verified system, as can be the case in the present disclosure, each system can extract information from the local running system as well as from the inputs from other systems, and use this information to detect and possibly react to observed behaviors, such as violation of non-obligable computation constraints detailed previously. Static verification can be used as a means to ensure valid and trusted software execution in a distributed system. Static verification is a computing system analysis and execution approach where information is extracted from a system prior its execution and used to detect and possibly react to observed behaviors satisfying or violating certain properties, here the violation of non-obligable computation constraints.

In a specific example, runtime verification can be used by authorizing nodes of the distributed ledger network in the running system to verify that non-obligable computation constraints, as described above, are satisfied. In another example, static verification or analysis can be used as a developer tool to allow or disallow specific coding constructions, such as allowing only code that verifies certain properties (e.g. non-obligable computation constraints detailed above). For instance, through static verification or analysis, a developer writing a shared code segment can be alerted to the fact that a particular shared code segment would violate non-obligable computation constraints, as described above, in a running system.

Further Example Shared Code Segments

Further examples of shared code segments and their shared execution are set forth below, in some cases using similar scenarios as described previously for continuity's sake.

FIG. 9A and FIG. 9B illustrate a scenario with example program code. The program code 900 comprises the shared code segments 902, 904, 906, 908, 910, 912, 914, 916, 918. This example is illustrated using trace code of the program code 900 which provides a record of the execution. However, this is just one way in which the program code can be executed.

In this example, there are the nodes Bank, Alice, Bob, Charlie and Robert. Each of the nodes may be associated with a participant who may be a human, company or other entity. For ease of reference, the use of the terms here refer to the node and not to the participant, even though it is the participant that may be required to give effect to any obligation that is created as part of the program code. This scenario relates to a person, Alice, wishing to get their house painted and is willing to borrow money to pay for the job to be completed within a time frame of 7 days. The person who initially agrees to perform the job delegates their obligation to another node.

Figure 10C:
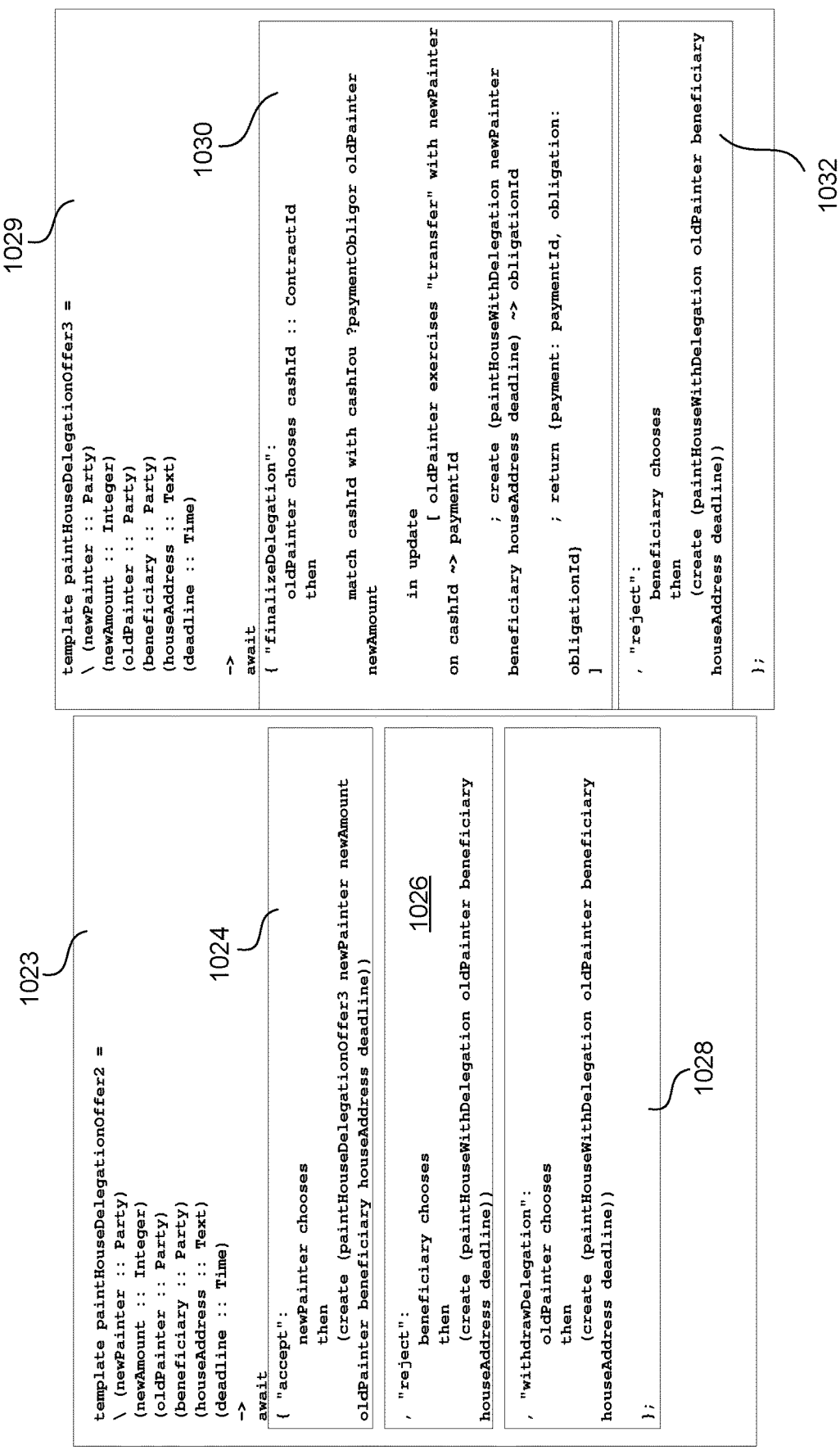

FIG. 10A, FIG. 10B and FIG. 10C illustrate example shared code segment templates 1002, 1004, 1006, 1008, 1010, 1012, 1014, 1016, 1018, 1020, 1022, 1024, 1026, 1028, 1030, 1032. In this example, the shared code segment templates are predefined segments of parameterized code templates with undefined parameters. The template cashIOU 1001 is an example code template. As can be seen, the types and number of the parameters are known, but the actual parameters are not specified in the template.

The shared code segments therefore are the shared code segment templates, but with the parameters in the code templates that have been defined and specified. For example, the section of program code 902 creates a 'cashIOU' object by instantiating the 'cashIOU' template 1001 with the parameters 'Bank' 'Charlie' and 10000. These parameters correspond to the Bank node, the Charlie node and 10000 units of currency, for example, $USD 10,000. There are three shared code segment templates associated with this 'cashIOU' object: "call" 1002, "transfer" 1004 and "split" 1006. That is, a 'Bank' node creates a cash IOU for another node referred to as 'Charlie' and the value of this cash IOU is $10,000. This code segment 902 is shared between the authorizing nodes Bank and Charlie. In order for shared code segment 902 to be executed, the executing node would require authorizations from the Bank node because the shared code segments activated by shared code segment 902 (and the corresponding functionality in the shared code segment templates 1002, 1004, 1006) still explicitly necessitate the authorization by the Charlie node, and therefore even when Bank node authorizes 902 it is not forcing Charlie node into the execution of a shared code segment.

In the shared code segment 904, the Charlie node takes $1,000 of the $10,000, and transfers the 1000 to a further node referred to as 'Alice.' This shared code segment 904 is shared between the authorizing nodes Bank, Charlie and Alice. In order for shared code segment 904 to be executed, the executing node would require authorizations from the Bank, Charlie and Alice.

Note that in other examples a shared code segment 904 could be composed of multiple shared code segments, such as in this case two shared code segments: one of which relates to the split of $1,000 from the $10,000; the other of which relates to the transfer of money from Charlie to Alice. The split shared code segment would be authorized by Charlie and the Bank, and therefore require authorizations from Charlie and the Bank. The transfer code segment would be authorized by Charlie and Alice and therefore require authorizations from Charlie and Alice.

In this case, Charlie exercising the split on the previously obtained cashIOU is authorized by the Bank because the Bank created the cashIOU (in the code 902) with a split functionality (see 1006). Therefore the Bank implicitly authorizes Charlie to perform splits on the cashIOU (although in other examples the split on the cashIOU may require an explicit authorization). If the Bank did not authorize Charlie to perform the split, then the Bank would not have provided the functionality to Charlie and the Bank may use a different code template from the one provided in code template 1001 which has split functionality 1006.

In the shared code segment 906, the Bob node offers to paint the house belonging to the Alice node which is located in Princeton, N.J., United States of America for $1,000. This shared code segment instantiates the code template 1009. Note that in this example, the Bob node is a computer and cannot actually paint the house itself, but Bob may be operated by a participant named Bob who is able to paint the house. As a result, the shared code segment 906 is the data and code that represents the commitment of a node, rather than the actual action itself. This code segment 906 is shared between the authorizing nodes Bob and Alice. In order for shared code segment 906 to be executed, the executing node would require only explicit authorizations from Bob because the code segments activated by shared code segment 906 (and the corresponding functionality in the code segment templates 1010, 1010b, 1010c) still explicitly necessitate the authorization by Alice or do not effect Alice (1010c), and therefore even when Bob authorizes 906 alone, it is not forcing Alice into the execution of a shared code segment.

In the shared code segment 908, the Alice node accepts Bob's offer to paint the house. The shared code segment additionally establishes a payment from Alice if the house has been painted. This shared code segment 908 corresponds to the accept functionality 1010 in the code template 1009, which is instantiated in this example to be shared between Alice and Bob. Similarly then to shared code segment 906, in order for shared code segment 908 to be executed, the executing node would require authorizations from Bob and Alice.

In the shared code segment 910, the Bob node proposes to delegate the job to another node referred to as Robert. When the agreement between Alice and Bob was made for Bob to paint Alice's house, the shared code segment template 1010 references the code template 1011, which is a code template for the house painting. Relevantly, this code template 1011 contains the functionality for the painter to delegate to another painter (see shared code segment template 1014). In shared code segment 910, Bob proposes to delegate to Robert. The delegate code template 1014 references the code template 1017, which is a template for an offer to delegate the painting of the house. The code template is similarly instantiated with the relevant parameters, in this case, this shared code segment 910 is shared between Alice and Bob. Robert is only referred to, and not sharing this shared code segment. In order for shared code segment 910 to be executed, the executing node would require explicit authorizations from Bob. Alice does not need to explicitly authorize 910 because the shared code segments activated by shared code segment 910 (and the corresponding functionality in the shared code segment templates 1018,1020, 1022) still explicitly necessitate the authorization by Alice or lead back (through 1022) to a shared code segment that was already authorized by Alice (1022 leads to 1012 and 1014), and therefore even when Bob authorizes 910 alone, it is not forcing Alice into the execution of a different shared code segment than already previously authorized.

Alice accepts this proposal to delegate the painting job in the shared code segment 912 which is an instantiated accept functionality on the code template 1018. The accept functionality references the code template 1023, which creates an offer for the delegated party to accept (see shared code segment template 1024). Robert also accepts the proposal in shared code segment 914, which is an instantiated version of the accept functionality on the code template 1023. The accept code segment template references the code template 1029, which creates an offer for the house painting which can be finalized by the old painter.

Bob accepts the proposal in shared code segment 916 by exercising a finalize delegation, which is an instantiated version of the shared code segment template 1030, and provides the obligation to paint the house to Robert, while also transferring to Robert the payment that was previously received from Alice. In order for shared code segment 916 to be executed, the executing node requires explicit authorizations from Bob as Alice and Robert have already provided their authorization for Bob to take this option in their previous authorizations (Alice in shared code segment 912, and Robert in shared code segment 914).

In the shared code segment 918, Alice accepts the delegation and finalizes the agreement so that the obligation cannot be delegated further, which is an instantiated version of the shared code segment template 1012. Alice is the only authorizing node for this shared code segment. In order for shared code segment 918 to be executed, the executing node would only require authorizations from Alice, as Robert has already accepted that Alice had this option when authorizing code segment 914.

When an executing node comes to execute the program code 900, the executing node will take into account the authorizing nodes for each of the code segments and ensure that appropriate authorizations are received in order to execute the code segments.

Implicitly above, the execution of all shared code segments satisfy shared authorization conditions and shared execution and execution path conditions, as detailed more fully above. Stated differently, the execution of all shared code segments in the examples above satisfy obligable execution conditions and do not place any nodes into an unauthorized execution state.

Example of External Computation

FIG. 11 illustrates an example similar to FIG. 1 but with an external computation involved. In this example, there is an additional shared code segment 148 (referred to as V in FIG. 10) which requires an output from a computer 160 that is external to the shared system 100. In this example, the computer 160 can provide the external computation, but an external computation can be performed by any entity that is not part of the shared system 100 such as a single computer, multiple computers or a network.

In this example, the authorizing node 106 has control over the authorized input and output provided to the computer 160 and provides the interface to the shared system 100. If the executing node 104 is executing the code segment 148, then the executing node 104 will defer to the authorizing node 106 for the purposes of providing the authorized input to the computer 160 and returning the authorized output to the executing node 104.

Figure 12:
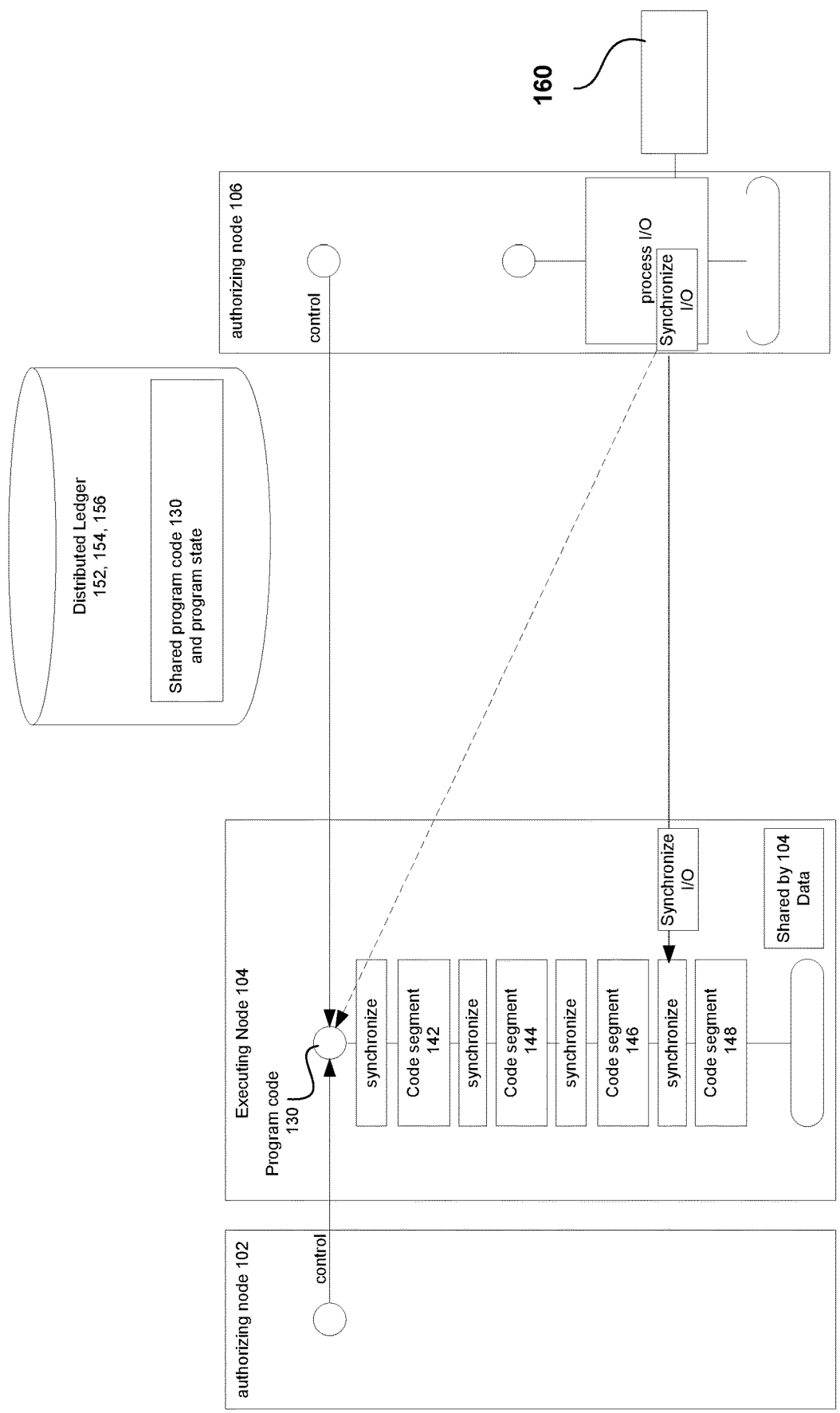
FIG. 12 is a schematic of the interaction of the nodes in the authorization computer system with the external computer.

FIG. 12 follows on from the example in FIG. 11 and illustrates how the authorizing nodes and executing nodes interact. The authorizing nodes 102 and 106 initially give the control to the executing node 104 to execute the program code 130 beginning with the code segment 142. Authorizing node 102 is an authorizing node for shared code segment 144, so the authorizing node 102 can pre-emptively authorize the execution of the shared code segment 144 at the same time as authorizing the execution of shared code segment 142. Authorizing node 106 is an authorizing node for all four shared code segments 142, 144, 146 and 148, and similarly the authorizing node 106 can authorize the execution of the shared code segments at the same time.

In this example, the executing node 104 is also the authorizing node for the shared code segments 144 and 146. In each case, the executing node checks to ensure that the proper authorizations have been received from the node, which may switch modes to an authorizing node 104 in order to provide the authorizations. Alternatively, the executing node 104 may impliedly authorize shared code segments without having to switch modes.

In this example, during or before the executing node 104 is executing the shared code segment 148, the authorizing node 106 processes the I/O relating to the external computation from the computer 160. As in shown in FIG. 12, there is a process of synchronizing the I/O to ensure that it has occurred as specified in the shared code segment 148. There are at least two possible alternatives to the synchronization of the I/O relating to the external computation from the computer 160. The first is that the I/O is synchronized just prior to the execution of the shared code segment 148 as illustrated by the solid arrow. Alternatively, as illustrated by the dashed arrow, the I/O is synchronized at the same point at which the authorizing node 106 gives control to the executing node 104 to execute the shared code segments. In either case, the I/O is synchronized before the shared code segment 148 is executed in order to prevent blocking the execution of the code to proceed on the executing node without I/O, as I/O is provided by the authorizing nodes.

In this example, where shared code segment 148 producing output data as part of I/O, this I/O data could still be provided before as it could be precomputed by the authorizing node 106 based on the authorized input data that 106 intends to provide. The executing node 104 would then be validating the provided authorized output and output data with regards to the execution of code segment 148.

An exemplary implementation of I/O is shown in shared code segment 1002, where the execution of the shared code segment 1002 instantiates code template 1000 which results in a "agreement" function which in this case creates an I/O output text involving the authorizing nodes designated as obligor and owner in this code template.

Example of Rewriting a Shared Code Segment

FIG. 13 is an example illustrating rewriting. In this example, the shared code segments 1302, 1302b, 1302c are rewritten with the shared code segment 1306 when the Charlie node requests to execute the shared code segment 1304. As above, rewriting in this context does not mean replacing shared code segments, rather that a new shared code segment 1306 overrides or supersedes the old shared code segments 1302, 1302b, 1302c. It is possible though to rewrite a shared code segment by adding a new shared code segment on to the distributed ledger where the new shared code segment overrides the old one.

The new shared code segment 1306 includes a finalized agreement for the payout to a given account, which may be interpreted as an I/O statement within an exemplary implementation of the executing node and the old shared code segments 1302, 1302b, 1302c contained only a reference to parameterized code template with undefined parameters. This is the nature of the functionality of shared code segment 1304 which causes the shared code segment 1302 to become redundant.

If the 'while awaiting' had been used for the definition of 1302, 1302b, 1302c the rewrite would not occur because the shared code segments 1302, 1302b, 1302c would still be validly usable. The 'while awaiting' function may allow for the creation of new shared code segments such as 1306, but maintains the validity of the old shared code segment 1302, 1302b, 1302c. Therefore the new shared code segment 1306 is valid and the existing shared code segments 1302, 1302b 1302c remain valid. This is to rewriting except that the new shared code segment or segments do not override or supersede the old shared code segment or segments.

As a result of the execution of 1304 and the rewrite of the shared code segments 1302, 1302b, 1302c into shared code segment 1306, the shared code segments 1302, 1302b, 1302c are no longer valid shared code segments. If the Charlie node wishes to transfer or split cash, then the operation would fail and not execute.

In this example, rewriting the shared code segments 1302, 1302b, 1302c comprised rewriting the entire shared code segments and in effect replacing the entire shared code segments 1302, 1302b, 1302c with the shared code segment 1306. In other examples, rewriting may also comprise providing one or more modified parameters to an existing data object, where the parameters may be rewritten as Bank and Alice instead of Bank and Charlie in a situation where Charlie gifted the cash settlement agreement to Alice.

Figure 14:
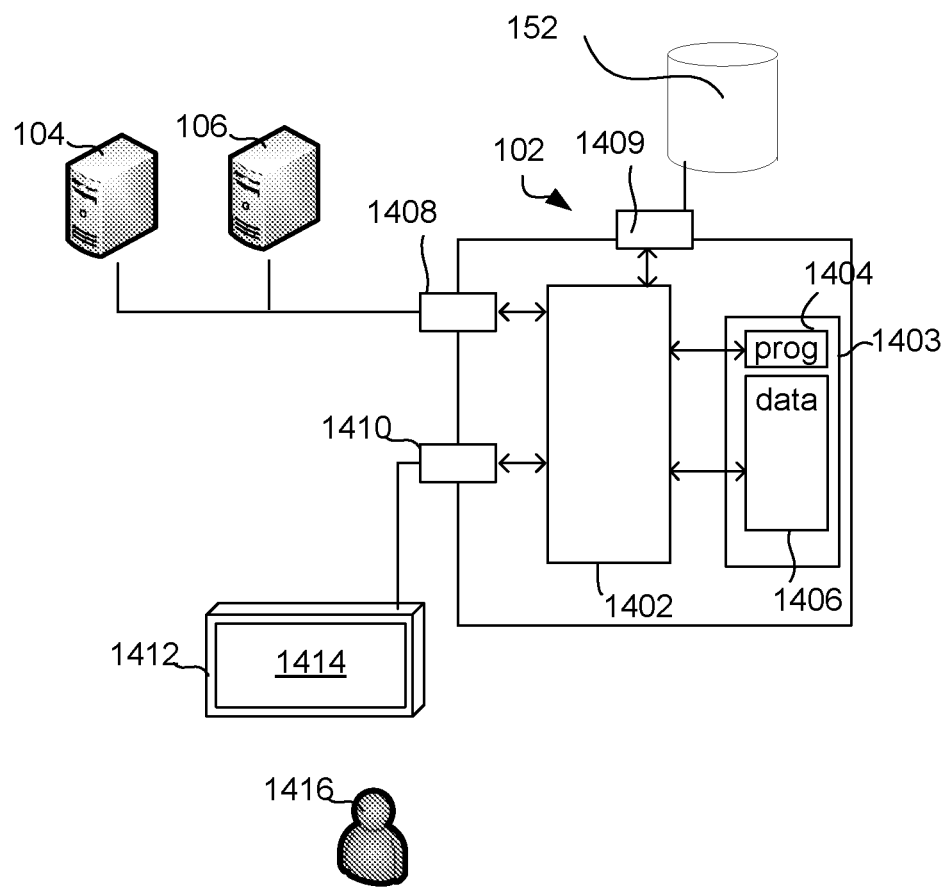
FIG. 14 is a schematic of an example of a processing device.

FIG. 14 illustrates an example node. The node 102 shown in FIG. 14 includes a processor 1402, a memory 1403, a network interface device 1408, a distributed ledger interface device 1409 that interfaces with the distributed ledger 152 and a user interface 1410. The memory stores instructions 1404 and data 1406 and the processor performs the instructions from the memory to implement the processes as described in FIGS. 1 to 13.

The processor 1402 performs the instructions stored on memory 1403. Processor 1402 receives an input by a user such as a participant 1416. Processor 1402 determines an instruction based on the current state of execution as recorded in the distributed ledger 152. The instruction may be a function to execute. The processor 3102 may execute instructions stored in the program code 1404 to indicate any output or result to the user 1416.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer system for distributed shared execution of one or more shared processes, comprising:
   one or more computing devices storing a distributed ledger;
   a first authorizing node comprising one or more processors; and
   a second authorizing node comprising one or more additional processors,
      wherein the first authorizing node and the second authorizing node are configured to execute first program code for the one or more shared processes that comprises one or more shared code segments shared between the first authorizing node and the second authorizing node, wherein the one or more shared code segments are executable by one or more executing nodes,
      wherein the one or more computing devices are configured to provide, from the distributed ledger, a record of valid code segments of the first program code and a record of one or more authorizing nodes required to authorize execution of, or delegate the execution of, the one or more shared code segments, and
      wherein the first authorizing node and the second authorizing node are further configured to execute second program code comprising instructions that, when executed by at least one of the first or second authorizing nodes, validates that an anticipated execution result of the one or more shared code segments satisfies shared authorization conditions and,
   if satisfied, authorizes the execution of the one or more shared code segments by the one or more executing nodes.

2. The computer system according to claim 1, wherein any one of the authorizing nodes or executing nodes, of a specified shared code segment, is configured to query the system to identify authorizing nodes required to authorize execution of, or delegate the execution of, the specified shared code segment.

3. The computer system according to claim 1 wherein the shared authorization conditions require that all anticipated execution results of the one or more shared code segments be cryptographically authorized by at least one of the first or second authorizing node, wherein the cryptographic authorization of the anticipated execution result comprises either an explicit or implicit cryptographic authorization of the anticipated execution result of the one or more shared code segments.

4. The computer system according to claim 3 wherein the explicit cryptographic authorization of the anticipated execution result of the one or more shared code segments comprises, as part of the second program code if the shared authorization conditions are satisfied, at least one of the first or second authorizing nodes cryptographically signing at least part of the anticipated execution result.

5. The computer system according to claim 4 wherein at least one of the first or second authorizing nodes, as part of the second program code if the shared authorization conditions are satisfied, cryptographically sign a transaction payload that is configured to cause a state transition to occur on the distributed ledger.

6. The computer system according to claim 3 wherein the implicit cryptographic authorization of the anticipated execution result of the one or more shared code segments comprises, as part of the second program code if the shared authorization conditions are satisfied, at least one of the first or second authorizing nodes utilizing a delegated or committing authorization from one or more delegating or committing nodes to authorize execution of the one or more shared code segments.

7. The computer system according to claim 6 wherein the delegated or committing authorization comprises the one or more delegating or committing nodes cryptographically authorizing the execution of a previously-executed shared code segment.

8. The computer system according to claim 7 wherein the cryptographic authorization of the execution of the previously-executed shared code segment comprises the one or more delegating or committing nodes cryptographically signing at least part of an anticipated execution result of the previously-executed shared code segment.

9. The computer system according to claim 1 wherein the shared authorization conditions require that any possible execution result stemming from execution of the one or more shared code segments satisfies shared execution conditions.

10. The computer system according to claim 9 wherein the shared execution conditions require that any delegated authorization be traceable back to a delegating node that requested the delegated authorization by way of a preceding transaction proposal request.

11. The computer system according to claim 9 wherein the shared execution conditions require that any committing authorization be traceable back to a committing node that requested the committing authorization by way of a preceding transaction proposal request.

12. The computer system according to claim 9 wherein the shared execution conditions require that any possible execution result stemming from execution of any code segments created, activated, or executed by the execution of the one or more shared code segments satisfies shared execution path conditions.

13. The computer system according to claim 12 wherein the shared execution path conditions require that any possible execution result stemming from execution of the created, activated, or executed code segments is traceable to a cryptographic authorization from an authorizing node.

14. The computer system according to claim 12 wherein the shared execution path conditions require at least one execution path to exist.

15. The computer system according to claim 1 wherein the second program code further comprises program instructions that, when executed, determine all explicit and implicit cryptographic authorizations required for authorized execution of the one or more shared code segments and, if not all explicit and implicit cryptographic authorizations are present, does not authorize execution of the one or more shared code segments.

16. A computer implemented method for shared execution of one or more shared processes, comprising:

authorizing one or more shared code segments forming at least part of program code for the one or more shared processes, the shared code segments shared between a first authorizing node and a second authorizing node, wherein the one or more shared code segments are executable by one or more executing nodes;

querying a distributed ledger to identify authorizing nodes required to authorize execution of, or delegate the execution of, the one or more shared code segments;

validating that an anticipated execution result of the one or more shared code segments satisfies shared authorization conditions and, if satisfied, authorizing the execution of the one or more shared code segments by the one or more executing nodes;

executing the validated shared code segments; and recording the execution of shared code segments of the program code on the distributed ledger.

17. The method according to claim 16 further comprising: recording validated shared code segments of the program code on the distributed ledger.

18. The method according to claim 16, further comprising, as part of validating the shared authorization conditions, validating that all anticipated execution results of the one or more shared code segments is cryptographically authorized by at least one of the first or second authorizing node, wherein the cryptographic authorization of the anticipated execution result comprises either an explicit or implicit cryptographic authorization of the anticipated execution result of the one or more shared code segments.

19. The method according to claim 18 wherein the explicit cryptographic authorization of the anticipated execution result of the one or more shared code segments comprises at least one of the first or second authorizing nodes cryptographically signing at least part of the anticipated execution result.

20. The method according to claim 19 wherein at least one of the first or second authorizing nodes, if the shared authorization conditions are satisfied, cryptographically sign a transaction payload that is configured to cause a state transition to occur on the distributed ledger.

21. The method according to claim 18 wherein the implicit cryptographic authorization of the anticipated execution result of the one or more shared code segments comprises, if the shared authorization conditions are satisfied, at least one of the first or second authorizing nodes utilizing a delegated or committing authorization from one or more delegating or committing nodes to authorize execution of the one or more shared code segments.

22. The method according to claim 21 wherein the delegated or committing authorization comprises the one or more delegating or committing nodes cryptographically authorizing the execution of a previously-executed shared code segment.

23. The method according to claim 22 wherein the cryptographic authorization of the execution of the previously-executed shared code segment comprises the one or more delegating or committing nodes cryptographically signing at least part of an anticipated execution result of the previously-executed shared code segment, wherein the execution result of the previously executed shared code segment creates or activates the one or more shared code segments.

24. The method according to claim 16, further comprising, as part of validating the shared authorization conditions, validating that any possible execution result stemming from execution of the one or more shared code segments satisfies shared execution conditions.

25. The method according to claim 24, further comprising, as part of validating the shared authorization conditions, validating that any delegated authorization is traceable back to a delegating node that requested the delegated authorization by way of a preceding transaction proposal request.

26. The method according to claim 24, further comprising, as part of validating the shared authorization conditions, validating that any committing authorization is traceable back to a committing node that requested the committing authorization by way of a preceding transaction proposal request.

27. The method according to claim 24, further comprising, as part of validating the shared execution conditions, validating that any possible execution result stemming from execution of any code segments created, activated, or executed by the execution of the one or more shared code segments satisfies shared execution path conditions.

28. The method according to claim 27, further comprising, as part of validating the shared execution path conditions, validating that any possible execution result stemming from execution of the created, activated, or executed code segments is traceable to a cryptographic authorization from an authorizing node, wherein the shared execution path conditions require at least one execution path to exist.

29. A non-transitory, machine readable medium storing instructions, that when performed by a computer system causes the computer system to perform a method, the method comprising:

authorizing one or more shared code segments forming at least part of program code for one or more shared processes, the shared code segments shared between a first authorizing node and a second authorizing node, wherein the one or more shared code segments are executable by one or more executing nodes;

querying a distributed ledger to identify authorizing nodes required to authorize execution of, or delegate the execution of, the one or more shared code segments;

recording valid shared code segments of the program code on the distributed ledger; and validating that an anticipated execution result of the one or more shared code segments satisfies shared authorization conditions and, if satisfied, authorizing the execution of the one or more shared code segments by the one or more executing nodes.

* * * * *